US008769671B2

(12) United States Patent
Shraim et al.

(10) Patent No.: US 8,769,671 B2
(45) Date of Patent: Jul. 1, 2014

(54) ONLINE FRAUD SOLUTION

(75) Inventors: Ihab Shraim, Germantown, MD (US);
Mark Shull, Chevy Chase, MD (US);
James Hepworth, Meridian, ID (US)

(73) Assignee: Markmonitor Inc., Boise, ID (US)

( * ) Notice: Subject to any disclaimer, the term of this patent is extended or adjusted under 35 U.S.C. 154(b) by 2149 days.

(21) Appl. No.: 10/709,398

(22) Filed: May 2, 2004

(65) Prior Publication Data

US 2005/0257261 A1    Nov. 17, 2005

(51) Int. Cl.
*G06F 11/00*    (2006.01)
(52) U.S. Cl.
USPC .......................................................... 726/22
(58) Field of Classification Search
USPC .......................................................... 726/22
See application file for complete search history.

(56) References Cited

U.S. PATENT DOCUMENTS

| | | | |
|---|---|---|---|
| 5,892,903 A | 4/1999 | Klaus | |
| 5,898,836 A | 4/1999 | Freivald et al. | |
| 5,930,479 A | 7/1999 | Hall | |
| 5,978,842 A | 11/1999 | Noble et al. | |
| 5,999,932 A | 12/1999 | Paul | |
| 6,032,260 A | 2/2000 | Sasmazel et al. | |
| 6,052,709 A | 4/2000 | Paul | |
| 6,055,508 A | 4/2000 | Naor et al. | |
| 6,092,194 A * | 7/2000 | Touboul | 726/24 |
| 6,366,933 B1 | 4/2002 | Ball et al. | |
| 6,421,768 B1 | 7/2002 | Purpura | |
| 6,432,113 B1 | 8/2002 | Parkin et al. | |
| 6,484,203 B1 | 11/2002 | Porras et al. | |
| 6,516,416 B2 | 2/2003 | Gregg et al. | |
| 6,606,659 B1 | 8/2003 | Hegli et al. | |
| 6,650,890 B1 | 11/2003 | Irlam et al. | |
| 6,654,787 B1 | 11/2003 | Aronson et al. | |
| 6,658,393 B1 | 12/2003 | Basch et al. | |
| 6,732,278 B2 | 5/2004 | Baird et al. | |
| 6,745,248 B1 | 6/2004 | Gardos et al. | |
| 6,772,334 B1 | 8/2004 | Glawitsch | |
| 6,990,590 B2 | 1/2006 | Hanson et al. | |

(Continued)

FOREIGN PATENT DOCUMENTS

| | | |
|---|---|---|
| WO | WO 2004/055632 | 7/2004 |
| WO | WO 2005/048522 | 5/2005 |
| WO | Wo 2005/098630 | 10/2005 |
| WO | WO 2006/090392 | 8/2006 |

OTHER PUBLICATIONS

Microsoft Phishing Filter, "Phising Filter Frequently Asked Questions" https://phishingfilter.microsoft.com/faq.aspx, 2007, 7 pages.

(Continued)

*Primary Examiner* — Tamara T Kyle
(74) *Attorney, Agent, or Firm* — Faegre Baker Daniels, LLP

(57) ABSTRACT

Various embodiments of the invention provide solutions, including systems, methods and software, for dealing with unethical uses of electronic mail, and in particular, with attempts to use email messages to facilitate online fraud. Some embodiments function to gather a set of at least one incoming email message, analyze that incoming message, categorize the message as a categorize the incoming email message as a fraudulent email message. Other embodiments can investigate the uniform resource locator included with the incoming email message to determine information about a server hosting the web site referenced by the uniform resource locator and pursue a response to a fraudulent attempt to collect personal information. In some cases, responses may be administrative and/or technical in nature.

21 Claims, 7 Drawing Sheets

(56) References Cited

U.S. PATENT DOCUMENTS

| | | |
|---|---|---|
| 6,993,588 B2 | 1/2006 | Davis et al. |
| 7,028,040 B1 | 4/2006 | Butler et al. |
| 7,072,944 B2 | 7/2006 | Lalonde et al. |
| 7,076,463 B1 | 7/2006 | Boies et al. |
| 7,076,801 B2 | 7/2006 | Gong et al. |
| 7,080,041 B2 | 7/2006 | Nagel |
| 7,092,992 B1 | 8/2006 | Yu |
| 7,096,498 B2 | 8/2006 | Judge |
| 7,096,500 B2 | 8/2006 | Roberts et al. |
| 7,114,177 B2 | 9/2006 | Rosenberg et al. |
| 7,149,778 B1 | 12/2006 | Patel et al. |
| 7,155,608 B1 | 12/2006 | Malik et al. |
| 7,191,210 B2 | 3/2007 | Grossman |
| 7,213,260 B2 | 5/2007 | Judge |
| 7,225,466 B2 | 5/2007 | Judge |
| 7,231,659 B2 | 6/2007 | Trilli et al. |
| 7,233,942 B2 | 6/2007 | Nye |
| 7,249,175 B1 | 7/2007 | Donaldson |
| 7,272,853 B2 | 9/2007 | Goodman et al. |
| 7,310,660 B1 | 12/2007 | White |
| 7,333,956 B2 | 2/2008 | Malcolm |
| 7,334,254 B1 | 2/2008 | Boydstun et al. |
| 7,343,626 B1 | 3/2008 | Gallagher |
| 7,359,948 B2 | 4/2008 | Ralston et al. |
| 7,360,025 B1 | 4/2008 | O'Connell et al. |
| 7,373,429 B2 | 5/2008 | Furukawa et al. |
| 7,457,823 B2 | 11/2008 | Shraim et al. |
| 7,461,257 B2 | 12/2008 | Olkin et al. |
| 7,464,264 B2 | 12/2008 | Goodman et al. |
| 7,526,730 B1 | 4/2009 | Cahill |
| 7,552,466 B2 | 6/2009 | Rosenberg et al. |
| 7,716,351 B1 | 5/2010 | White et al. |
| 7,870,608 B2 | 1/2011 | Shraim et al. |
| 2001/0044820 A1 | 11/2001 | Scott |
| 2002/0026478 A1 | 2/2002 | Rodgers et al. |
| 2002/0087885 A1 | 7/2002 | Peled et al. |
| 2002/0099649 A1* | 7/2002 | Lee et al. ................. 705/38 |
| 2002/0124172 A1 | 9/2002 | Manahan |
| 2002/0129013 A1 | 9/2002 | Thomas |
| 2002/0133721 A1 | 9/2002 | Adjoute |
| 2002/0138634 A1 | 9/2002 | Davis et al. |
| 2002/0169971 A1 | 11/2002 | Asano et al. |
| 2003/0023878 A1 | 1/2003 | Rosenberg et al. |
| 2003/0050964 A1 | 3/2003 | Debaty et al. |
| 2003/0056116 A1 | 3/2003 | Bunker et al. |
| 2003/0097409 A1* | 5/2003 | Tsai ................. 709/206 |
| 2003/0101357 A1 | 5/2003 | Ronen et al. |
| 2003/0105973 A1 | 6/2003 | Liang et al. |
| 2003/0110293 A1 | 6/2003 | Friedman et al. |
| 2003/0126119 A1 | 7/2003 | Lin |
| 2003/0131260 A1 | 7/2003 | Hanson et al. |
| 2003/0133450 A1 | 7/2003 | Baum |
| 2003/0172167 A1 | 9/2003 | Judge |
| 2003/0172291 A1 | 9/2003 | Judge et al. |
| 2003/0172292 A1 | 9/2003 | Judge |
| 2003/0172294 A1 | 9/2003 | Judge |
| 2003/0208624 A1 | 11/2003 | Grossman |
| 2003/0225841 A1 | 12/2003 | Song et al. |
| 2003/0225850 A1 | 12/2003 | Teague |
| 2004/0003248 A1 | 1/2004 | Arkhipov |
| 2004/0034695 A1 | 2/2004 | Touch et al. |
| 2004/0044912 A1 | 3/2004 | Connary et al. |
| 2004/0054917 A1 | 3/2004 | Obrecht et al. |
| 2004/0064335 A1 | 4/2004 | Yang |
| 2004/0064736 A1 | 4/2004 | Obrecht et al. |
| 2004/0068542 A1 | 4/2004 | Lalonde et al. |
| 2004/0078422 A1 | 4/2004 | Toomey |
| 2004/0078564 A1 | 4/2004 | Abdulhayoglu |
| 2004/0098607 A1 | 5/2004 | Alagna et al. |
| 2004/0117377 A1 | 6/2004 | Moser et al. |
| 2004/0122939 A1 | 6/2004 | Perkins |
| 2004/0123157 A1* | 6/2004 | Alagna et al. ................. 713/201 |
| 2004/0143670 A1 | 7/2004 | Roychowdhury et al. |
| 2004/0148506 A1 | 7/2004 | Prince |
| 2004/0187023 A1 | 9/2004 | Alagna et al. |
| 2004/0254848 A1 | 12/2004 | Golan et al. |
| 2005/0015447 A1 | 1/2005 | Kocheisen et al. |
| 2005/0015626 A1 | 1/2005 | Chasin |
| 2005/0021853 A1 | 1/2005 | Parekh et al. |
| 2005/0027083 A1 | 2/2005 | Kuniyoshi et al. |
| 2005/0027879 A1 | 2/2005 | Karp |
| 2005/0027983 A1 | 2/2005 | Klawon |
| 2005/0038756 A1 | 2/2005 | Nagel |
| 2005/0055569 A1* | 3/2005 | Shipp ................. 713/201 |
| 2005/0060263 A1 | 3/2005 | Golan et al. |
| 2005/0060643 A1 | 3/2005 | Glass et al. |
| 2005/0068756 A1 | 3/2005 | Tsuji et al. |
| 2005/0071748 A1* | 3/2005 | Shipp ................. 715/501.1 |
| 2005/0071766 A1 | 3/2005 | Brill et al. |
| 2005/0076222 A1 | 4/2005 | Olkin et al. |
| 2005/0091227 A1 | 4/2005 | McCollum |
| 2005/0097320 A1 | 5/2005 | Golan et al. |
| 2005/0108569 A1 | 5/2005 | Bantz et al. |
| 2005/0114453 A1 | 5/2005 | Hardt |
| 2005/0149507 A1 | 7/2005 | Nye |
| 2005/0154601 A1 | 7/2005 | Halpern et al. |
| 2005/0188079 A1 | 8/2005 | Motsinger et al. |
| 2005/0188080 A1 | 8/2005 | Motsinger et al. |
| 2005/0188221 A1 | 8/2005 | Motsinger et al. |
| 2005/0188222 A1 | 8/2005 | Motsinger et al. |
| 2005/0198099 A1 | 9/2005 | Motsinger et al. |
| 2005/0198160 A1 | 9/2005 | Shannon et al. |
| 2005/0210107 A1 | 9/2005 | Mora |
| 2005/0222900 A1 | 10/2005 | Fuloria et al. |
| 2005/0234922 A1 | 10/2005 | Parekh et al. |
| 2005/0251539 A1 | 11/2005 | Parekh et al. |
| 2005/0257261 A1 | 11/2005 | Shraim et al. |
| 2005/0262209 A1 | 11/2005 | Yu |
| 2005/0289148 A1* | 12/2005 | Dorner et al. ................. 707/10 |
| 2006/0020812 A1 | 1/2006 | Steinberg et al. |
| 2006/0021031 A1* | 1/2006 | Leahy et al. ................. 726/22 |
| 2006/0031315 A1 | 2/2006 | Fenton et al. |
| 2006/0041508 A1 | 2/2006 | Pham et al. |
| 2006/0041621 A1 | 2/2006 | Libbey |
| 2006/0047766 A1 | 3/2006 | Spadea |
| 2006/0064374 A1 | 3/2006 | Helsper et al. |
| 2006/0068755 A1 | 3/2006 | Shraim et al. |
| 2006/0070126 A1 | 3/2006 | Grynberg |
| 2006/0075030 A1 | 4/2006 | van Riel |
| 2006/0080735 A1 | 4/2006 | Brinson et al. |
| 2006/0101120 A1 | 5/2006 | Helsper et al. |
| 2006/0101334 A1 | 5/2006 | Liao et al. |
| 2006/0123105 A1 | 6/2006 | Parekh et al. |
| 2006/0123464 A1 | 6/2006 | Goodman et al. |
| 2006/0123478 A1* | 6/2006 | Rehfuss et al. ................. 726/22 |
| 2006/0129644 A1 | 6/2006 | Owen et al. |
| 2006/0136294 A1 | 6/2006 | Linden et al. |
| 2006/0149580 A1 | 7/2006 | Helsper et al. |
| 2006/0168006 A1 | 7/2006 | Shannon et al. |
| 2006/0168041 A1 | 7/2006 | Mishra et al. |
| 2006/0168066 A1 | 7/2006 | Helsper et al. |
| 2006/0174341 A1 | 8/2006 | Judge |
| 2006/0179005 A1* | 8/2006 | Li et al. ................. 705/64 |
| 2006/0190718 A1 | 8/2006 | Singh et al. |
| 2006/0206572 A1 | 9/2006 | Lalonde et al. |
| 2006/0224752 A1 | 10/2006 | Parekh |
| 2006/0230272 A1 | 10/2006 | Lawrence et al. |
| 2006/0230279 A1 | 10/2006 | Morris |
| 2006/0251068 A1 | 11/2006 | Judge et al. |
| 2006/0253447 A1 | 11/2006 | Judge |
| 2006/0253584 A1 | 11/2006 | Dixon et al. |
| 2006/0265747 A1 | 11/2006 | Judge |
| 2007/0005967 A1 | 1/2007 | Mister et al. |
| 2007/0028301 A1 | 2/2007 | Shull et al. |
| 2007/0073630 A1 | 3/2007 | Greene et al. |
| 2007/0083670 A1 | 4/2007 | Kelley et al. |
| 2007/0101423 A1* | 5/2007 | Oliver et al. ................. 726/22 |
| 2007/0107053 A1 | 5/2007 | Shraim et al. |
| 2007/0124270 A1 | 5/2007 | Page |
| 2007/0128899 A1 | 6/2007 | Mayer |
| 2007/0150374 A1 | 6/2007 | Grossman |
| 2007/0208856 A1 | 9/2007 | Rounthwaite et al. |
| 2007/0255821 A1 | 11/2007 | Ge et al. |
| 2007/0294762 A1 | 12/2007 | Shraim et al. |

(56) References Cited

U.S. PATENT DOCUMENTS

| | | |
|---|---|---|
| 2007/0300286 A1 | 12/2007 | Judge |
| 2008/0005342 A1 | 1/2008 | Schneider |
| 2008/0052359 A1* | 2/2008 | Golan et al. .................. 709/206 |
| 2008/0091946 A1 | 4/2008 | Paulsen et al. |
| 2008/0141342 A1 | 6/2008 | Curnyn |
| 2008/0199006 A1 | 8/2008 | Gandolph et al. |
| 2008/0288790 A1 | 11/2008 | Wilson |
| 2008/0306835 A1 | 12/2008 | Agura et al. |
| 2009/0100185 A1 | 4/2009 | Sheha et al. |
| 2010/0228759 A1 | 9/2010 | Thomas |

OTHER PUBLICATIONS

Anonymous "Lessons Learned by Consumers, Financial Sector Firms, and Government Agencies During the Recent Rise of Phishing Attacks", Financial and Banking Information Infrastructure Committee and the Financial Services Sector Coordinating Council, May 2004.
Chou, N., R. Ledesma, Y. Teraguchi and J.C. Mitchell "Client-Side Defense Against Web-Based Identity Theft", Proceedings of the 11th Annual Network and Distributed System Security Symposium (NDSS 04), Feb. 2004.
Dhamija, R. and J.D. Tygar "Phish and HIPs: Human Interactive Proofs to Detect Phishing Attacks", in "Human Interactive Proofs", Baird, H.S. and D.P. Lopresti, Eds., LNCS 3517, May 3, 2005, pp. 127-141.
Emigh, A. "Online Identity Theft: Phishing Technology, Chokepoints and Countermeasures", ITTC Report on Online Theft Technology and Countermeasures, Oct. 3, 2005.
Federal Deposit Insurance Corporation "Putting an End to Account-Hijacking Identity Theft", Division of Supervision and Consumer Protection, Technology Supervision Branch, Dec. 14, 2004.
Garfinkel, S. and L.F. Cranor "What is Phishing (or, How to Fight Phishing at the User-Interface Level)", O'Reilly Network, downloaded from www.oreillynet.com/lpt/a/6274, Oct. 25, 2005.
G-Lock Software "Advanced Administrative Tools Reference Guide", 2003.
Glenbrook Partners "Phishing", downloaded from www.paymentsnews.com, Feb. 23, 2004.
Hansell "Technology; Online Swindlers, Called 'Phishers,' Lure the Unwary", New York Times, Mar. 24, 2004.
Kirda, E. and D. Kruegel "Protecting Users Against Phishing Attacks with AntiPhish", Proceedings of the 29th Annual International Computer Science and Applications Conference (COMPSAC'05), Jul. 26-28, 2005, pp. 517-524.
Legon "'Phishing' Scams Reel in Your Identity", CNN.com, Jan. 26, 2004.
Levy, E. "Criminals Become Tech Savvy", IEEE Security & Privacy, vol. 2, No. 2, Mar.-Apr. 2004, pp. 65-68.
Ollmann, G. "The Phishing Guide: Understanding & Preventing Phishing Attacks", NGSSoftware Insight Security Research, downloaded from www.ngsconsulting.com, Sep. 2004.
Seltzer, L. "Spotting Phish and Phighting Back", eWeek Enterprise News & Reviews, downloaded from www.eweek.com, Aug. 2, 2004.
Tally, G., R. Thomas and T. Van Vleck "Anti-Phishing: Best Practices for Institutions and Consumers", McAfee Research, Mar. 2004.
Tally, G., R. Thomas and T. Van Vleck "Anti-Phishing: Best Practices for Institutions and Consumers", McAfee Research, Technical Report #04-004, Sep. 2004.
Thompson, B. "How to Avoid the Phishing Bug", BBC News, Jan. 23, 2004.
U.S. Federal Bureau of Investigation "FBI Says Web 'Spoofing' Scams are a Growing Problem", press release, Jul. 21, 2003.
U.S. Department of Justice "Special Report on 'Phishing'", Criminal Division, Mar. 2004.
Yang, Y., L. Brown and E. Lewis "eCommerce Trust via the Proposed W3 Trust Model", Proceedings of the Post-Graduate ADFA Conference for Computer Science, Jul. 14, 2001.

Youl, T. "Phishing Scams: Understanding the Latest Trends", white paper, FraudWatch International, Jun. 2004.
Zhang, Y., J. Hong and L. Cranor "Cantina: A Content-Based Approach to Detecting Phishing Websites", Proceedings of the WWW 2007 Conference, Security, Privacy, Reliability and Ethics Track, May 8-12, 2007, pp. 639-648.
U.S. Appl. No. 60/273,826, filed Mar. 8, 2001, File History, 41 pages.
U.S. Appl. No. 60/273,835, filed Mar. 8, 2001, File History, 21 pages.
U.S. Appl. No. 60/273,836, filed Mar. 8, 2001, File History, 70 pages.
U.S. Appl. No. 60/282,142, filed Apr. 9, 2001, File History, 74 pages.
U.S. Appl. No. 60/433,345, filed Dec. 13, 2002, File History, 15 pages.
U.S. Appl. No. 60/502,296, filed Sep. 12, 2003, File History, 16 pages.
U.S. Appl. No. 60/502,297, filed Sep. 12, 2003, File History, 9 pages.
Prince, et al., Understanding How Spammers Steal Your E-mail Address: An Analysis of the First Six Months of data from Project Honey Pot, 2005, retrieved from http://www.ceas.cc/papers-2005/163.pdf on Jan. 25, 2009, 7 pages total.
Project Honey Pot, Frequently Asked Questions (FAQ), publicly available as of Aug. 4, 2004 as evidenced by Internet Archive WayBack Machine, retrieved from http://web.archive.org/web/*/http://www.projecthoneypot.org/faq.php.
Seigneur, et al., PR3 Email Honeypot, Sep. 12, 2003, retrieved from https://wsww.cs.tcd.ie/publications/tech-reports/reports.03/TCD-CS-2003-39.pdf on Jan. 25, 2009, 12 pages total.
U.S. Appl. No. 10/996,566, Office Action dated Nov. 25, 2008, 13 pgs.
U.S. Appl. No. 10/996,567, Office Action dated Feb. 6, 2009, 26 pgs.
U.S. Appl. No. 10/996,568, Office Action dated Feb. 3, 2009, 51 pgs.
U.S. Appl. No. 10/996,646, Office Action dated Dec. 23, 2008, 22 pgs.
U.S. Appl. No. 10/996,991; Office Action dated Jan. 7, 2009, 24 pgs.
U.S. Appl. No. 11/428,072, Advisory Action dated Feb. 9, 2009, 3 pgs.
ZoEmail, Flash Demo, publicly available as of Feb. 27, 2004 as evidenced by Internet Archive WayBack Machine, retrieved from http://web.archive.org/web/*/http://www.zoemail.com/demo, htm, pp. 1-3.
ZoEmail, How ZoEmail Works, ZoEmail vs. Other Anti-Spam Options, ZoEmail features, publicly available as of Dec. 14, 2003 as evidence by Internet Archive WayBack Machine, retrieved from http://web.archive.org/web/*/http://www.zoemail.net, pp. 1-12.
ZoEmail, Lightning QuickStart Guide, ZoEmail User Guide, publicly available as of Jan. 25, 2004 as evidenced by Internet Archive WayBack Machine, retrieved from http://web.archive.org/web/*/http://www.zoemail.com/help.htm, pp. 1-37.
Androutsopoulos et al., "Learning to Filter Spam E-Mail: A Coparison of a Naïve Bayesian and a Meory-Based Approach", Proceedings of the 4th European Conference on Prinicples and Practice of Knowledge Discovery in Databases (PKDD 2000), Workshop on Machine Learning and Textual Information Access, 2000, pp. 1-13.
Graham, P. "Better Bayesian Filtering", downloaded from www.paulgraham.com/better.html, Jan. 2003.
Graham, P., "A Plan for Spam", downloaded from www.paulgraham.com/spam.htl, Aug. 2002.
Kohn, D. "How Scores are Assigned", downloaded from wiki.apache.org/spamassassin, Jul. 13, 2004.
Mason, J. "Filtering Spam with SpamAssassin", downloaded from spamassassin.org, Proceedings of the HEANet Annual Conference, 2002.
Mertz, D., "Spam Filtering Techniques", downloaded from www.ibm.com/developerworks/linux/library, Sep. 1, 2002.
Ollmann, G. "The Pharming Guide: Understanding & Preventing DNS-Related Attacks by Phishers", NGSSoftware Insight Security Research, downloaded from www.ngssoftware.com/papers/ThePharmingGuide.pdf, Jul. 2005.
Sergeant, M. "Internet Level Spam Detection and SpamAssassin 2.50", downloaded from spoamassassin.org, Proceedings of the Spam Conference, 2003.
Stern, H. "Fast SpamAssassin Score Learning Tool", downloaded from spamassassin.apache.org, Jan. 8, 2004.

(56) References Cited

OTHER PUBLICATIONS

U.S. Appl. No. 10/996,646, filed Nov. 23, 2004, Non-Final Office Action dated Jun. 3, 2008.
U.S. Appl. No. 10/997,626, filed Nov. 23, 2004, Final Office Action dated Jan. 31, 2008.
U.S. Appl. No. 11/428,072, filed Jun. 30, 2006, Non-Final Office Action dated May 29, 2008.
U.S. Appl. No. 11/237,642, Office Action dated Aug. 1, 2008, 40 pgs.
Jon Lebowsky; Shout Shamalamal; Jul. 8, 1997; the Austin Chronicle; pp. 1-5 retrieved from http://weeklywire.com/ww/07-08-97/austin_screens_feature1.html.
K. Moore; Simple Mail Transfer Protocol (SMTP) Service Extension for Delivery Status Notification (DSNs); Jan. 2003; Network Working Group; pp. 1-33.
U.S. Appl. No. 10/996,566, Office Action (RR) dated Jun. 18, 2008.
U.S. Appl. No. 10/996,567, Office Action dated Aug. 5, 2008.
U.S. Appl. No. 10/996,568, Office Action (RR) dated Sep. 17, 2008.
U.S. Appl. No. 10/996,990, Non Final Office Action dated Sep. 15, 2008, 50 pages.
U.S. Appl. No. 10/996,993, filed Nov. 23, 2004, Non-Final Office Action dated Jun. 19, 2008.
U.S. Appl. No. 10/997,626, Notice of Allowance dated Aug. 22, 2008.
Androutsopoulos et al., "Learning to Filter Spam E-Mail: A Coparison of a Naïve Bayesian and a Meory-Based Approach", Proceedings of the 4th European Conference on Principles and Practice of Knowledge Discovery in Databases (PKDD 2000), Workshop on Machine Learning and Textual Information Access, 2000, pp. 1-13.
Graham, P., "Filters that fight back", Published Aug. 2003.
Spamback (Retreived from http://web.archive.org/web/20010422081736/http://cexx.org/snicker/spamback.htm, Publication date: Apr. 22, 2001.
U.S. Appl. No. 10/996,566, Non-Final Office Action dated Dec. 7, 2009, 12 pgs.
U.S. Appl. No. 10/996,566, Final Office Action dated Jun. 25, 2009, 16 pgs.
U.S. Appl. No. 10/996,567, Final Office Action dated Nov. 24, 2009, 15 pgs.
U.S. Appl. No. 10/996,567, Restriction Requirement dated Mar. 7, 2008, 7 pgs.
U.S. Appl. No. 10/996,568, Final Office Action dated Dec. 8, 2009, 42 pgs.
U.S. Appl. No. 10/996,568, Non-Final Office Action dated Feb. 3, 2009, 44 pgs.
U.S. Appl. No. 10/996,646, Non-Final Office Action dated Nov. 12, 2009, 17 pgs.
U.S. Appl. No. 10/996,991, Final Office Action dated Nov. 12, 2009, 15 pgs.
U.S. Appl. No. 10/996,993, Non-Final Office Action dated Mar. 22, 2010, 9 pgs.
U.S. Appl. No. 10/996,993, Restriction Requirement dated Apr. 27, 2009, 6 pgs.
U.S. Appl. No. 11/428,072, Final Office Action dated Mar. 15, 2010, 14 pgs.
U.S. Appl. No. 11/428,072, Non-Final Office Action dated Sep. 29, 2009, 14 pgs.
U.S. Appl. No. 11/428,072, Final Office Action dated Nov. 24, 2008, 11 pgs.
U.S. Appl. No. 11/550,142, Non-Final Office Action dated Nov. 9, 2009, 30 pgs.
U.S. Appl. No. 11/539,357, Non-Final Office Action dated Oct. 16, 2009, 17 pgs.
Zawodny, J., "Spam the Spammers", Published Jul. 11, 2002.
419 Eater (Retrieved from http://web.archive.org/web/20031206063258/419eater.com/html/baiting.htm), Publication Date: Dec. 6, 2003.
Final Office Action, issued in U.S. Appl. No. 10/709,398, mailed Sep. 2, 2009, 35 pages.
Garfinkel, S. and L.F. Cranor "What is Phishing (Or, How to Fight Phishing at the User-Interface Level)", Oct. 25, 2005.
Hiner, J. "Sam Spade: The Swiss Army Knife of Network Analysis", downloaded from www.techrepublic.com, Dec. 20, 2000.
May, C. et al. "Advanced Information Assurance Handbook", CERT®/CC Training and Education Center, document No. CMU/SEI-2004-HB-001, Mar. 2004, pp. 243-253.
Non-Final Office Action issued in U.S. Appl. No. 10/709,398, mailed Mar. 13, 2008, 43 pages.
Non-Final Office Action issued in U.S. Appl. No. 10/996,567, mailed Oct. 13, 2010, 17 pages
Non-Final Office Action, issued in U.S. Appl. No. 10/997,626, mailed Jun. 20, 2007, 94 pages.
Notice of Allowance issued in U.S. Appl. No. 10/996,566, mailed Sep. 7, 2010, 9 pages.
Pasley, T. "Using Sam Spade", SANS Institute InfoSec Reading Room, 2003.
Sam Spade "Internet Protocol Addressing and the Domain Name System", downloaded from www.samspade.org, Feb. 1, 2003.
U.S. Appl. No. 12/263,791, Office Action dated Mar. 17, 2014, 31 pgs.

* cited by examiner

ONLINE FRAUD SOLUTION

BACKGROUND OF INVENTION

The present invention relates to systems, methods and software for dealing with unethical uses of electronic mail and for preventing online fraud.

Electronic mail ("email") has become a staple of modern communications. Unfortunately, however, anyone who uses email on a regular basis is familiar with the vast quantities of "spam" (unsolicited email) sent to nearly every email addressee from various advertisers. Although somewhat analogous to traditional paper "junk mail," spam is unique in that, for virtually no cost, a purveyor of spam ("spammer") can easily and quickly generate and transmit copious amounts of spam. Further, limitations in the Internet-standard simple mail transport protocol ("SMTP") allow spammers to transmit spam with relative anonymity and, therefore, with correspondingly little accountability. Consequently, even though spam annoys the vast majority of recipients and, thus, generates few successful sales opportunities for the spammer relative to the amount of spam transmitted, the spam "industry" is burgeoning: Given their ability to inexpensively and quickly transmit enormous quantities of spam, spammers can make a handsome profit even from the relatively low response rate to the spam advertising.

By their nature, spammers continually search for new recipients (victims) to which to send spam. The spam "industry," therefore has launched a derivative industry of "harvesters," who scour the Internet and other sources to generate lists of valid email addresses, which they then sell to the spammers. (Obviously, since these activities go hand-in-hand, many spammers act as harvesters for themselves or their fellow spammers). Harvesters use a variety of techniques for obtaining email address lists, and often develop automated search programs (commonly referred to as "robots" or "web crawlers") that continually skulk about the Internet searching for new email addresses. For example, harvesters obtain email addresses from Internet (and other) news groups, chat rooms, and directory service (e.g., white pages) sites, as well as message boards, mailing lists, and web pages, on which users commonly provide email addresses for feedback, etc.

The success of spamming in general has given rise to an even more virulent form of email abuse, know as "spoofing." This practice involves inserting a false email address in the "From" or "Reply-to" headers of an email message, thereby misleading the recipient into believing that the email originated from a relatively trusted source. Spoofed emails often appear to be from well-known Internet service providers ("ISPs") (such as, for example, America Online™ and The Microsoft Network™), or other high-profile entities with easily-identifiable email addresses (including, for example IBM™, Microsoft™, General Motors™ and E-Bay™, as well as various financial institutions, online retailers and the like). This spoofing is unacceptable to these entities for many reasons, not the least because it causes customer confusion, destroys the value of a well-cultivated online presence, creates general mistrust of the spoofed brands and largely dilutes the value of a reputable entity's online communications and transactions.

Perhaps most alarmingly, spam (and spoofed spam in particular) has increasingly been used to promote fraudulent activity, including identity theft, unauthorized credit card transactions and/or account withdrawals, and the like. This technique, known in the art as "phishing," involves masquerading as a trusted business in order to induce an unsuspecting consumer to provide confidential personal information, often in response to a purported request to update account information, confirm an online transaction, etc. Merely by way of example, a "phisher" may send a spoof email purporting to be from the recipient's bank and requesting (ironically) that the recipient "confirm" her identity by providing confidential information by reply email or by logging on to a fraudulent web site. Similarly, a common "phish" message requests that the recipient log on to a well-known e-commerce site and "update" credit card information stored by that site.

The phish email often includes a uniform resource locator ("URL") purporting to link to the web site of spoofed sender, but which actually redirects the recipient to a spoofed web site (i.e., a web site that imitates or is designed to look like the web site of the spoofed source of the email). Upon visiting the spoofed web site, the recipient may be presented with a form that requests information such as the recipient's address, phone number, social security number, bank account number, credit card number, mother's maiden name, etc. The recipient, believing that she is communicating with a trusted company, may provide some or all of this information, which then is at the spammer's disposal to use for any of a variety of illegitimate purposes.

While such activity is indisputably both illegal and immoral, the relative anonymity of the spammers, as well as the international nature of the Internet, hinders effective legal prosecution for these activities. Merely by way of example, the server associated with the spoofed web site may be located in a country from which prosecution/extradition is highly unlikely. Moreover, these spoofed web sites are often highly transient, existing on a given server or ISP for a short time (perhaps only a matter of days or even hours) before the spammer moves on to a new server or ISP. Compounding the enforcement problem is the fact that many of the servers hosting spoofed web sites are legitimate servers that have been compromised (or "hacked") by the spammer or his associates, with the owner/operator of the server having no idea that the server is secretly being used for illegitimate purposes.

Accordingly, there is a need for a solution to deal with these email abuses.

SUMMARY OF INVENTION

Various embodiments of the invention provide solutions (including inter alia, systems, methods and software) for dealing with unethical uses of electronic mail, and in particular, with attempts to use email messages to facilitate online fraud. Some embodiments function to gather a set of at least one incoming email message, analyze that incoming message, categorize the message as a categorize the incoming email message as a fraudulent email message. Other embodiments can investigate the uniform resource locator included with the incoming email message to determine information about a server hosting the web site referenced by the uniform resource locator and/or can pursue a response to a fraudulent attempt to collect personal information. In some cases, responses may be administrative and/or technical in nature.

Merely by way of example, one set of embodiments provides systems for combating online fraud. One exemplary system, which can be used in a relationship between a fraud protection provider and a customer, can comprise a monitoring center for monitoring a suspicious email activity, which itself can comprise a first computer. The first computer can have instructions executable by the first computer to allow an analysis (which can be performed by the first computer, by a technician, etc.) of an investigation of a uniform resource locator. The monitoring center can further comprise a first telecommunication link, which may be configured to provide communication between a technician and the customer, such that the technician can notify the customer of a result of the investigation of a uniform resource locator, and/or the customer can provide instructions for responding to a fraudulent attempt to collect personal information. The exemplary system can further comprise a second telecommunication link configured to provide data communication between the monitoring center and at least one additional computer.

The exemplary system can further comprise a second computer in communication with the monitoring center, perhaps via the second telecommunication link, and the second computer may include instructions executable by the second computer to gather an incoming email message, analyze the incoming email message and/or, based on an analysis of the incoming email message, categorize the incoming email message as a possibly fraudulent email message. The incoming email message may comprise a uniform resource locator, and the instructions may be executable by the computer to investigate the uniform resource locator included in the incoming email message to determine whether a location referenced by the incoming email message is associated with a fraudulent attempt to collect personal information.

Another exemplary system for combating fraud can comprise a monitoring center for monitoring a suspicious email activity. The monitoring center can comprise a first computer, which may include instructions executable by the first computer to allow the analysis of the suspicious email activity and/or the initiation of a response to the suspicious email activity. The first computer may also be configured to analyze the suspicious email activity, allow a technician to analyze the suspicious email activity, and/or notify the customer that a fraudulent email message has been received.

In accordance with some embodiments, the system can also have a second computer in communication with the monitoring center and having instructions to gather an incoming email message addressed to a bait email address. The bait email address may have been seeded at a location on a computer network likely to be a target for a third party attempting to harvest email addresses. The incoming email message may include a uniform resource locator configured to direct a recipient of the incoming email message to a web site referenced by the uniform resource locator. A third computer in communication with the second computer and further in communication with the monitoring center can have instructions executable to analyze the incoming email message and, based on an analysis of the incoming email message, categorize the incoming email message as a fraudulent email message. (In some embodiments, the first computer, second computer and/or third computer may be the same computer.) The third computer may also investigate the uniform resource locator included with the incoming email message to determine information about a server hosting the web site referenced by the uniform resource locator and/or prepare a report comprising at least some of the information about the server hosting the web site referenced by the uniform resource locator.

Further, in some embodiments, the first computer may have instructions to pursue (and/or allow a technician to initiate) a response, which may be an administrative response and/or a technical response, against an operator of the server. The system can, in some cases, include a set of at least one computer (which can, of course be a plurality of computers), each of which can include instructions executable to pursue a technical response. If the set of at least one computer is a plurality of computers, the technical response can be a distributed technical response against the server.

Other embodiments provide a computer system for combating fraud, which also may be used, inter alia, in a relationship between a fraud protection provider and a customer, and which can comprise a processor and a computer readable medium in communication with the processor. The computer readable medium can have instructions executable by the processor to gather an incoming email message, the incoming email message (which again may comprise a uniform resource locator, analyze the incoming email message, and, based on an analysis of the incoming email message, categorize the incoming email message as a possibly fraudulent email message. The instructions can also be executable to investigate the uniform resource locator included in the incoming email message to determine whether a location referenced by the incoming email message is associated with a fraudulent attempt to collect personal information and/or to initiate a response to the fraudulent attempt to collect personal information.

Another set of embodiments provides systems for analyzing suspicious email messages and/or other data files. One such system can comprise a processor and a computer readable medium in communication with the processor. The computer readable medium can comprise comprising instructions executable by the processor to parse the suspicious email message to identify a header portion of the suspicious email message, a body portion of the suspicious email message, and a uniform resource locator portion of the suspicious email message. The computer can also analyze the header portion of the suspicious email message; analyze the body portion of the suspicious email message and/or analyze the uniform resource locator portion of the suspicious email message. In some cases, the instructions can further be executable to categorize the suspicious email message as a possibly fraudulent email message.

In some cases, based on the analysis of the header portion of the email message, the computer may be instructed to assign a score to the header portion of the suspicious email message and/or to compare the score assigned to the header portion of the suspicious email message with a threshold score for the header portion of the suspicious email message. Likewise, based on the analysis of the body portion of the suspicious email message, a score may be assigned to the body portion of the suspicious email message and/or compared with a threshold score for the body portion of the suspicious email message, and/or, based on the analysis of the uniform resource locator portion of the suspicious email message, a score may be assigned to the uniform resource locator portion of the suspicious email message.

The instructions may also be executable by the computer to compare the score assigned to the uniform resource locator portion of the suspicious email message with a threshold score for the uniform resource locator portion of the suspicious email message. Based on the comparison of the score assigned to the uniform resource locator portion of the suspicious email message and the threshold score for the uniform resource locator portion of the suspicious email message, the computer may categorize the suspicious email message as a possibly fraudulent email message.

In other embodiments, the instructions might be further executable to compute a composite score based on the score assigned to the header portion of the suspicious email message, the score assigned to the body portion of the suspicious email message and the score assigned to the uniform resource locator portion of the suspicious email message; to assign the composite score to the suspicious email message; and/or to compare the composite score assigned to the suspicious email message with a threshold composite score for the suspicious email message. based on the comparison of the composite score assigned the suspicious email message and the threshold score for the suspicious email message, the suspicious email message can be categorized as a possibly fraudulent email message.

Still further embodiments of the invention provide a computer system for investigating a suspicious uniform resource locator to determine whether a server referenced by the uniform resource locator may be involved in fraudulent activity. The computer system can comprise a processor and a computer readable medium in communication with the processor; the computer readable medium can comprise instructions executable by the processor to ascertain an address associated with a server referenced by the uniform resource locator, obtain information about an address the uniform resource locator appears to reference, compare the ascertained address associated with the information about the address the uniform resource locator appears to reference, and/or, based on the comparison of the ascertained address and the information about the address the uniform resource locator appears to reference, determine whether the uniform resource locator is fraudulent.

In some cases, ascertaining an address associated with the server referenced by the uniform locator may comprise tracing a route to the server referenced by the uniform resource locator. In other cases, obtaining information about an address the uniform resource locator appears to reference may comprise parsing an anchor associated with the uniform resource locator to identify an apparent address for a server referenced by the uniform resource locator and/or to identify a trusted entity apparently referenced by the uniform resource locator. In addition, the instructions can be further executable to obtain WHOIS (and/or other) information about the apparent address for the server referenced by the uniform resource locator.

The medium may comprise further instructions executable to interrogate the server referenced by the uniform resource locator and/or generate an event report. Interrogating the server can comprise downloading at least one web page from the server referenced by the uniform resource locator and/or analyzing the at least one web page to determine whether the at least one web page comprises a field for allowing a user to provider personal information to the server referenced by the at least one uniform resource locator. Alternatively and/or in addition, interrogating the server can comprise examining the server for vulnerabilities that indicate the server possible has been compromised.

Yet further embodiments of the invention can include systems for responding to a fraudulent attempt to collect personal information. One exemplary system can include a processor and a computer readable storage medium, which can comprise instructions executable by the processor to download a web page from a suspicious server and/or parse the web page to identify at least one field into which a user may enter personal information. The at least one field can be analyzed to identify a type of information requested by the at least one field, and/or one or more sets of safe data may be generated. In some cases, the set(s) of safe data can comprise personal information associated with one or more fictitious entities. Analyzing the at least one field to identify a type of information requested by the field may comprise interpreting a label associated with the at least one field.

Based on an analysis of the at least one field, the processor may also select at least a portion of each of the set(s) of safe data comprising the type of information requested by the at least one field, format one or more responses to the web page (which may include the portion(s) of the safe data comprising the type of information requested by the at least one field), and transmit the response(s) to the web page for reception by the suspicious server. In accordance with particular embodiments, one (or more) of the sets of safe data can be associated with a financial account, and the computer readable medium might comprise further instructions executable by the processor to monitor the financial account for an account activity evidencing a use of information obtained from the set of safe data and/or to trace the account activity to identify an entity using the information obtained from the set of safe data.

In some cases, the computer may be configured to transmit for reception by the suspicious server a number of responses to the web page sufficient to cause a recipient of the responses to be uncertain which of a plurality of responses include valid personal information and/or a number of responses to the web page sufficient to indicate that the fraudulent attempt to collect personal information has been discovered. In other cases, the computer may be configured to transmit for reception by the suspicious server a number of responses to the web page sufficient to prevent the suspicious server from receiving any responses comprising valid personal information.

Other embodiments can include methods for combating online fraud, analyzing suspicious email messages and/or data files, investigating suspicious uniform resource locators and/or responding to a fraudulent attempt to collect personal information, including the methods and/or procedures described above with respect to exemplary computer systems. Similarly, still other embodiments can comprise software applications (and/or computer readable media embodying such software applications) that can be executable to perform these methods.

Merely by way of example, one set of embodiments comprises computer software applications. An exemplary application can be executable by a computer create at least one safe account, which may be associated with at least one bait email address. The application may be further executable to seed the at least one bait email address at a location on a computer network likely to be a target for a third party attempting to harvest email addresses.

In some cases, the application can be executable to gather an incoming email message addressed to the at least one bait email address, and the incoming email message might include a uniform resource locator configured to direct a recipient of the incoming email message to a web site referenced by the uniform resource locator. The application can be executable to analyze the incoming email message, based on an analysis of the incoming email message, categorize the incoming email message as a possibly fraudulent email message, and/or investigate the uniform resource locator included with the incoming email message to determine information about a server hosting the web site referenced by the uniform resource locator.

Some computer applications may be further executable to prepare a report comprising at least some of the information about the server hosting the web site referenced by the uniform resource locator, to allow an analysis of the report to determine whether the server is likely to attempt to fraudulently collect personal information and/or to analyze the report to determine whether the server is likely to attempt to fraudulently collect personal information.

In some cases an application may be further executable to allow a technician to initiate an action in response to a fraudulent attempt by the server to collect personal information and/or to pursue an action in response to a fraudulent attempt by the server to collect personal information. In other cases, the computer software application may comprise a plurality of interoperable software modules, such that each of the plurality of interoperable software modules can be executable by a different computer.

As noted above, some embodiments of the invention can comprise methods. One exemplary method (which can be used to combat online fraud, among other things) can comprise creating at least one safe account associated with at least one bait email address; seeding the at least one bait email address at a location on a computer network, the location being a likely target for a third party attempting to harvest email addresses (such as, merely by way of example, a domain registration record, a newsgroup, an electronic mailing list, an electronic customer list, an online chat room, an online message board and a list of active email addresses); and/or gathering an incoming email message addressed to the at least one bait email address. The incoming email message may include a uniform resource locator configured to direct a recipient of the incoming email message to a web site referenced by the uniform resource locator and/or may purport to be from the customer.

In some cases, the method can comprise analyzing the incoming email message. Analyzing the incoming email message may include analyzing a header portion of the message, a body portion of the message and/or a uniform resource locator included with the message. Analyzing the header portion can include determining whether the incoming message is a spoofed message and/or determining whether the incoming email message originates from a suspicious Internet domain. Analyzing the body portion can include searching the body portion of the incoming message for strings indicating that the incoming message may be part of an attempt to fraudulently collect personal information. Analyzing a uniform resource locator can include determining whether the uniform resource locator references a suspicious Internet location. Analyzing the incoming email message can also include assigning a score to the incoming email message and/or comparing the assigned score with a threshold score.

Based on an analysis of the incoming email message, the incoming email message may be categorized as a fraudulent email message. In other cases, the uniform resource locator included with the incoming email message can be investigated, e.g., to determine information about a server hosting the web site referenced by the uniform resource locator. Investigating the uniform resource locator can include accessing a set of WHOIS information about an apparent address referenced by the uniform resource locator, ascertaining an Internet Protocol address referenced by the uniform resource locator, and/or interrogating the server hosting the web site referenced by the uniform resource locator.

Optionally, a report can be prepared. The report may comprise at least some of the information about the server hosting the web site referenced by the uniform resource locator, and the report may be analyzed to determine whether the server is engaged in a fraudulent attempt to collect personal information. If desired, an action may be taken to respond to the fraudulent attempt to collect personal information.

Other methods can further comprise establishing a customer profile for the customer, wherein the customer profile includes instructions governing how an attempted online fraud should be handled. Thus, taking an action to respond the fraudulent collection of personal information may comprise consulting the customer profile to determine which of a plurality of actions to take to respond to the fraudulent collection of personal information by the server. In certain embodiments, taking an action to respond to the fraudulent collection of personal information by the server comprises notifying the customer of the fraudulent attempt to collect personal information, pursuing an administrative response against an operator of the server, and/or pursuing a technical response against the server (and/or its operator).

Administrative responses can include, inter alia, notifying an Internet service provider associated with the server that the server is engaged in a fraudulent activity. Technical responses can include, inter alia, providing fictitious personal information to the server; the fictitious personal information may formatted to be responsive to the at least one field for providing personal information to a web page hosted by the server, and/or the fictitious personal information can comprise a traceable identifier (which can comprise an account identifier for a financial account associated with the customer), and pursuing a technical response against the server can comprise tracing a use of the traceable identifier. In some cases, the method can include providing sufficient fictitious personal information to impede the use of any valid personal information received by the server and/or sufficient fictitious personal information to notify an operator of the server that the attempt to fraudulently collect personal information has been discovered. In other cases, fictitious personal information may be provided at a rate sufficient to impede the server's ability to receive personal information from any other sources.

In some cases, the information about the server indicates that the server has been compromised in a fraudulent attempt to collect personal information, and taking an action to respond to a fraudulent attempt by the server to collect personal information comprises notifying an operator of the server that the server has been compromised.

As noted above, other sets of embodiments can include systems and/or software applications, which can include without limitation systems implementing the methods described above and/or software applications executable by a computer to implement these methods.

BRIEF DESCRIPTION OF DRAWINGS

The invention has been briefly summarized above. One skilled in the art will ascertain additional features and advantages of specific embodiments by references to the attached figures and the detailed descriptions thereof, wherein.

DETAILED DESCRIPTION

In accordance with various embodiments, systems, methods and software are provided for combating online fraud. A particular type of online fraud uses "spoofed" email messages to induce unsuspecting consumers into accessing an illicit web site and providing personal information to a server believed to be operated by a trusted affiliate (such as a bank, online retailer, etc.), when in fact the server is operated by another party masquerading as the trusted affiliate in order to gain access to the consumers" personal information. As used herein, the term "personal information" should be understood to include any information that could be used to identify a person and/or normally would be revealed by that person only to a relatively trusted entity. Merely by way of example, personal information can include, without limitation, a financial institution account number, credit card number, expiration date and/or security code (sometimes referred to in the art as a "Card Verification Number," "Card Verification Value," "Card Verification Code" or "CVV"), and/or other financial information; a userid, password, mother's maiden name, and/or other security information; a full name, address, phone number, social security number, driver's license number, and/or other identifying information.

1. Overview

Figure 1:
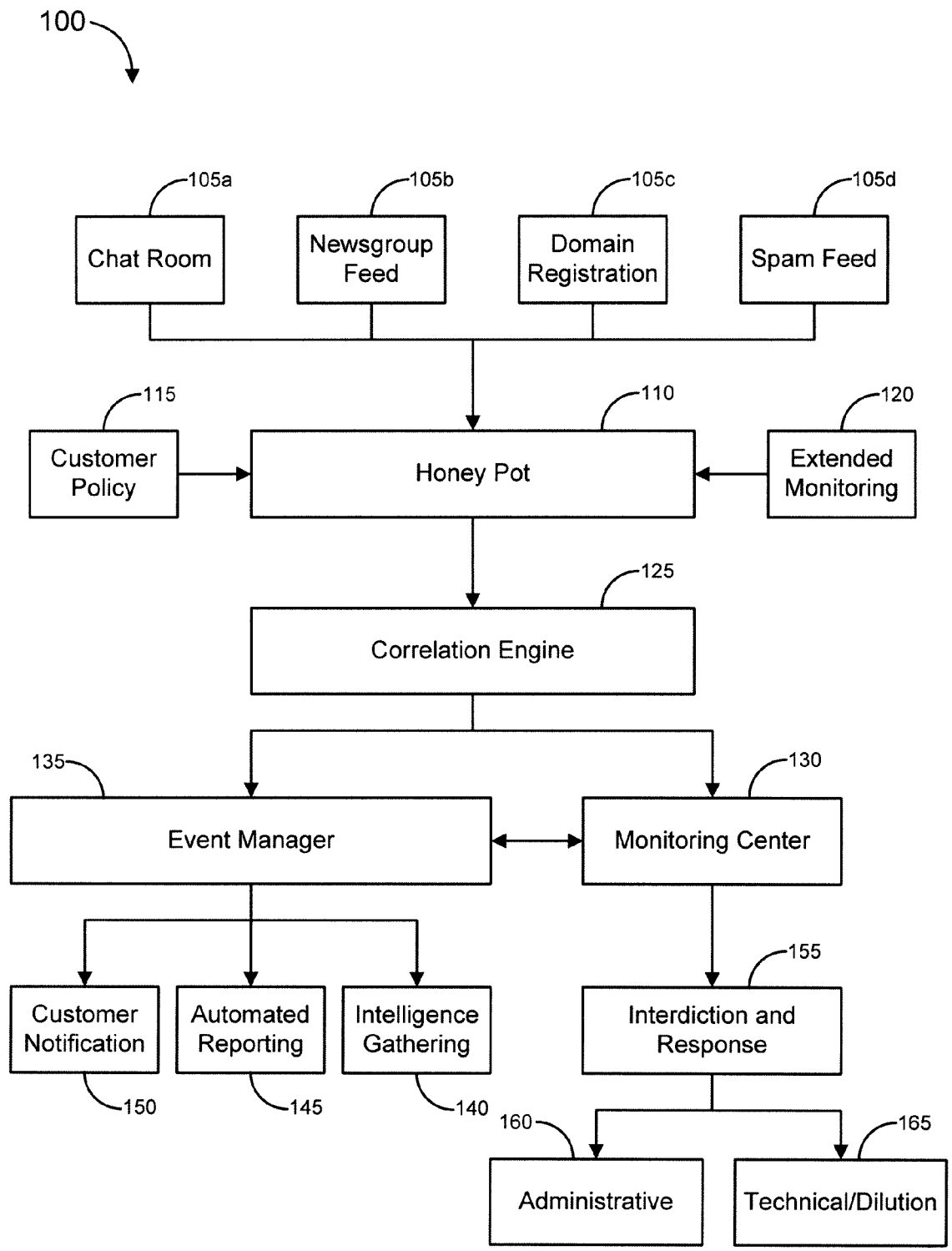
FIG. 1 is a functional diagram illustrating a system for combating online fraud, in accordance with various embodiments of the invention.

Certain embodiments of the invention feature systems, methods and/or software that attract such spoofed email messages, analyze the messages to assess the probability that the message is involved with a fraudulent activity (and/or comprises a spoofed message), and provide responses to any identified fraudulent activity. FIG. 1 illustrates the functional elements of an exemplary system 100 that can be used to combat online fraud in accordance with some of these embodiments and provides a general overview of how certain embodiments can operate. (Various embodiments will be discussed in additional detail below). It should be noted that the functional architecture depicted by FIG. 1 and the procedures described with respect to each functional component are provided for purposes of illustration only, and that embodiments of the invention are not necessarily limited to a particular functional or structural architecture; the various procedures discussed herein may be performed in any suitable framework.

In many cases, the system 100 of FIG. 1 may be operated by a fraud prevention service, security service, etc. (referred to herein as a "fraud prevention provider") for one or more customers. Often, the customers will be entities with brands and/or web sites that risk being spoofed, such as online merchants, financial institutions, businesses, etc. In other cases, however, the fraud prevention provider may be an employee of the customer an/or an entity affiliated with and/or incorporated within the customer, such as the customer's security department, information services department, etc.

The system 100 plants or "seeds" bait email addresses in a variety of locations 105, which can include, merely by way of example, online chat rooms 105a, newsgroup feeds 105b, domain registration records ("WHOIS" records for a domain) 105c, and spam feeds (which can be any source or list of bait email addresses that have been harveste) 105d. In general, these bait email addresses are designed to offer an attractive target to a harvester of email addresses, and the bait email addresses usually (but not always) will be generated specifically for the purpose of attracting phishers and therefore will not be used for normal email correspondence.

The system 100 can further include a "honey pot" 110, which monitors each of the bait email addresses for incoming email. The honey pot 110, therefore, can comprise a device and/or software that functions to receive email messages (such as an SMTP server, etc.) and/or retrieve email messages (such as a POP3 and/or IMAP client, etc.) addressed to the bait email addresses. Such devices and software are well-known in the art and need not be discussed in detail herein. In accordance with various embodiments, the honey pot 110 can be configured to receive any (or all) of a variety of well-known message formats, including SMTP, MIME, HTML, RTF, SMS and/or the like.

The honey pot 110 may also be configured to operate in accordance with a customer policy 115. An exemplary customer policy might instruct the honey pot to watch for certain types and/or formats of emails, including, for instance, to search for certain keywords, allowing for customization on a customer-by-customer basis. In addition, the honey pot 110 may also utilize extended monitoring options 120, including monitoring for other conditions, such as monitoring a customer's web site for compromises, etc. The honey pot 110, upon receiving a message, optionally can convert the email message into a data file.

In some embodiments, the honey pot 110 will be in communication with a correlation engine 125, which performs an analysis of the email messages received by the honey pot 110. On a periodic basis and/or as incoming email messages are received/retrieved by the honey pot 110, the honey pot 110 will transmit the received/retrieved email messages (and/or corresponding data files) to the correlation engine 125 for analysis. Alternatively, the correlation engine 125 may be configured to periodically retrieve messages/data files from the honey pot 110 (e.g., using a scheduled FTP process, etc.). The correlation engine 125 can then analyze the email messages (and/or the data files corresponding to those messages) to determine whether any of the messages received by the honey pot 110 are phish messages and/or are likely to evidence an fraudulent attempt to collect personal information. Procedures for performing this analysis are described in detail below.

The correlation engine 125 can be in communication with a monitoring center 130 and an event manager 135, which may also be in communication with one another. In particular embodiments, the event manager 135 may be a computer and/or software application, which can be accessible by a technician in the monitoring center 130. If the correlation engine 125 determines that a particular incoming email message is a likely candidate for fraudulent activity, the correlation engine 125 can signal to the event manager 135 that an event should be created for the email message. Upon the creation of an event, the event manager can commence an intelligence gathering operation (investigation) 140 of the email message and/or any URLs included in the email message. As described in detail below, the investigation can include gathering information about the domain and/or IP address associated with the URLs, as well as interrogating the server(s) hosting the resources (e.g., web page, etc.) referenced by the URLs. (As used herein, the term "server" is sometimes used, as the context indicates, any computer system that is capable of offering IP-based services or conducting online transactions in which personal information may be exchanged, and specifically a computer system that may be engaged in the fraudulent collection of personal information, such as by serving web pages that request personal information. The most common example of such a server, therefore, is a web server that operates using the hypertext transfer protocol ("HTTP") and/or any of several related services, although in some cases, servers may provide other services, such as database services, etc.). In certain embodiments, if a single email message includes multiple URLs, a separate event may be created for each URL; in other cases, a single event may cover all of the URLs in a particular message. If the message and/or investigation indicates that the event relates to a particular customer, the event may be associated with that customer.

The event manager can also prepare an automated report 145 (and/or cause another process, such as a reporting module (not shown) to generate a report), which may be analyzed by an additional technician at the monitoring center 130 (or any other location, for that matter), for the event; the report can include a summary of the investigation and/or any information obtained by the investigation. In some embodiments, the process may be completely automated, so that no human analysis is necessary. If desired (and perhaps as indicated by the customer policy 115), the event manager 135 can automatically create a customer notification 150 informing the affected customer of the event. The customer notification 150 can comprise some (or all) of the information from the report 145. Alternatively, the customer notification 150 can merely notify the customer of an event (e.g., via email, telephone, pager, etc.) allowing a customer to access a copy of the report (e.g., via a web browser, client application, etc.).

If the investigation 140 reveals that the server referenced by the URL is involved in a fraudulent attempt to collect personal information, the technician may initiate an interdiction response 155. (Alternatively, the event manager 135 could be configured to initiate a response automatically without intervention by the technician). Depending on the circumstances and the embodiment, a variety of responses could be appropriate. For instance, those skilled in the art will recognize that in some cases, a server can be compromised (i.e., "hacked"), in which case the server is executing applications and/or providing services not under the control of the operator. (As used in this context, the term "operator" means an entity that owns, maintains and/or otherwise is responsible for the server.) If the investigation 140 reveals that the server appears to be compromised, such that the operator of the server is merely an unwitting victim and not a participant in the fraudulent scheme, the appropriate response could simply comprise informing the operator of the server that the server has been compromised, and perhaps explaining how to repair any vulnerabilities that allowed the compromise.

On the other hand, if the investigation 140 reveals that the server has not been compromised (implying that the operator of the server is knowingly engaged in the fraudulent collection of personal information), other responses may be more appropriate. Such responses can be classified generally as either administrative 160 or technical 165 in nature, as described more fully below.

In accordance with various embodiments of the invention, therefore, an email message may be received and analyzed to determine if the email message is likely to be part of a phishing scheme. As used herein, the term "phishing" means a fraudulent scheme to collect personal information, often by sending unsolicited email requesting that the recipient provide the information to an apparently-legitimate server. If so, the email and/or any associated URLs may be investigated, and responsive action may be taken. Additional details and other embodiments are discussed in further detail below.

2. Exemplary Embodiments

Figure 2:
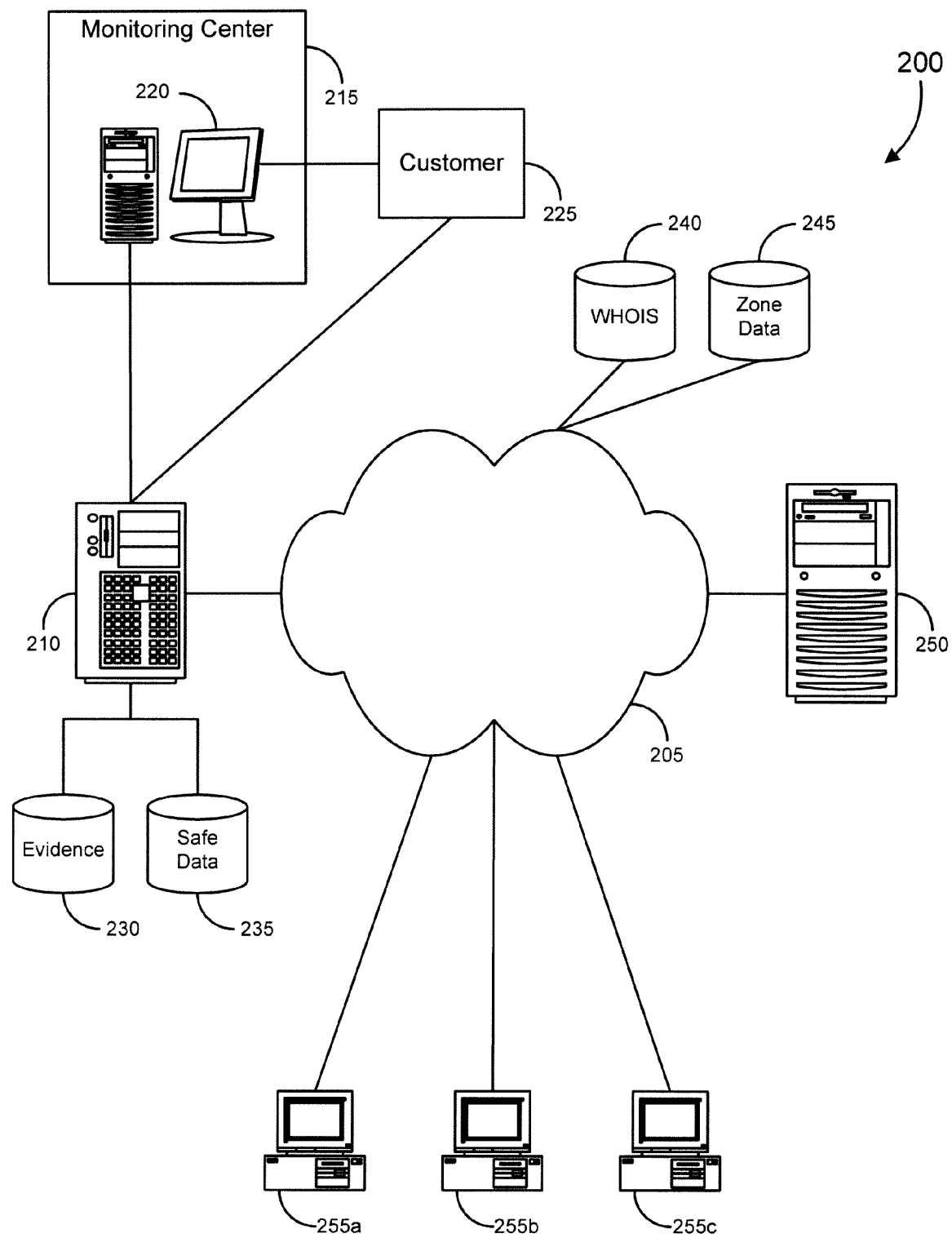
FIG. 2 is a schematic diagram illustrating a system for combating online fraud, in accordance with various embodiments of the invention.

As noted above, certain embodiments of the invention provide systems for dealing with online fraud. The system 200 of FIG. 2 can be considered exemplary of one set of embodiments. The system 200 generally runs in a networked environment, which can include a network 205. In many cases, the network 200 will be the Internet, although in some embodiments, the network 205 may be a private network. In general, any network capable of supporting data communications between computers will suffice. The system 200 includes a master computer 210, which can be used to perform any of the procedures or methods discussed herein. In particular, the master computer 210 can be configured (e.g., via a software application) to seed bait email addresses, gather and/or analyze email messages transmitted to the bait email addresses, create and/or track events, investigate URLs and/or servers, prepare reports about events, notify customers about events, and/or communicate with a monitoring center 215 (and, more particularly, with a monitoring computer 220 within the monitoring center) e.g. via a telecommunication link. The master computer 210 may be a plurality of computers, and each of the plurality of computers may be configured to perform specific processes in accordance with various embodiments. Merely by way of example, one computer may be configured to perform the functions described above with respect to a honey pot, another computer may be configured to execute software associated with a correlation engine, e.g. performing the analysis of email messages/data files, and a third computer may be configured to serve as an event manager, e.g., investigating and/or responding to incidents of suspected fraud. Likewise, the monitoring computer 220 may be configured to perform any appropriate functions.

The monitoring center 215, the monitoring computer 220, and/or the master computer 210 may be in communication with one or more customers 225 e.g., via a telecommunication link, which can comprise connection via any medium capable of providing voice and/or data communication, such as a telephone line, wireless connection, wide area network, local area network, virtual private network, and/or the like. Such communications may be data communications and/or voice communications (e.g., a technician at the monitoring center can conduct telephone communications with a person at the customer). Communications with the customer(s) 225 can include transmission of an event report, notification of an event, and/or consultation with respect to responses to fraudulent activities.

The master computer 210 can include (and/or be in communication with) a plurality of data sources. For example, the master computer can comprise an evidence database 230 and/or a database of "safe data," 235, which can be used to generate and/or store bait email addresses and/or fictitious personal information for use as discussed in detail below. (As used herein, the term "database" should be interpreted broadly to include any means of storing data, including traditional database management software, operating system file systems, and/or the like.) The master computer 210 can also be in communication with one or more sources of information about the Internet and/or any servers to be investigated. Such sources of information can include a domain WHOIS database 240, zone data file 245, etc. Those skilled in the art will appreciate that WHOIS databases often are maintained by central registration authorities (e.g., the American Registry for Internet Numbers ("ARIN"), Network Solutions, Inc., etc), and the master computer 210 can be configured to query those authorities; alternatively, the master computer 210 could be configured to obtain such information from other sources, such as privately-maintained databases, etc. The master computer 210 may use these resources, and others, such as publicly-available domain name server (DNS) data, routing data and/or the like, to investigate a server 250 suspected of conducting fraudulent activities. As noted above, the server 250 can be any computer capable of processing online transactions, serving web pages and/or otherwise collecting personal information.

The system can also include one or more response computers 255, which can be used to provide a technical response to fraudulent activities, as described in more detail below. (It should be noted that the fractions of the response computers 255 can also be performed by the master computer 210, monitoring computer 220, etc.) In particular embodiments, a plurality of computers (e.g., 255a-c) can be used to provide a distributed response. The response computers 255, as well as the master computer 210 and/or the monitoring computer 220, can be special-purpose computers with hardware, firmware and/or software instructions for performing the necessary tasks. Alternatively, these computers 210, 220, 255 may be general purpose computers having an operating system including, for example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. In particular embodiments, the computers 210, 220, 255 can run any of a variety of free operating systems such as GNU/Linux, FreeBSD, etc.

The computers 210, 220, 255 can also run a variety of server applications, including HTTP servers, FTP servers, CGI servers, database servers, Java servers, and the like. These computers can be one or more general purpose computers capable of executing programs or scripts in response to requests from and/or interaction with other computers, including without limitation web applications. Such applications can be implemented as one or more scripts or programs written in any programming language, including merely by way of example, C, C++, Java™, COBOL, or any scripting language, such as Perl, Python, or TCL, or any combination thereof. The computers 210, 220, 255 can also include database server software, including without limitation packages commercially available from Oracle™, Microsoft, Sybase™, IBM and the like, which can process requests from database clients running locally and/or on other computers. Merely by way of example, the master computer 210 can be an Intel™ processor-machine operating the GNU/Linux operating system and the PostgreSQL database engine, configured to run proprietary application software for performing tasks in accordance with embodiments of the invention.

In some embodiments, one or more computers 110 can create web pages dynamically as necessary for displaying investigation reports, etc. These web pages can serve as an interface between one computer (e.g., the master computer 210) and another (e.g., the monitoring computer 220). Alternatively, a computer (e.g., the master computer 210) may run a server application, while another (e.g., the monitoring computer 220) device can run a dedicated client application. The server application, therefore, can serve as an interface for the user device running the client application. Alternatively, certain of the computers may be configured as "thin clients" or terminals in communication with other computers.

The system 200 can include one or more data stores, which can comprise one or more hard drives, etc. and which can be used to store, for example, databases (e.g., 230, 235) The location of the data stores is discretionary: Merely by way of example, they can reside on a storage medium local to (and/or resident in) one or more of the computers. Alternatively, they can be remote from any or all of these devices, so long as they are in communication (e.g., via the network 205) with one or more of these. In some embodiments, the data stores can reside in a storage-area network ("SAN") familiar to those skilled in the art. (Likewise, any necessary files for performing the functions attributed to the computers 210, 220, 255 can be stored a computer-readable storage medium local to and/or remote from the respective computer, as appropriate.)

Figure 3:
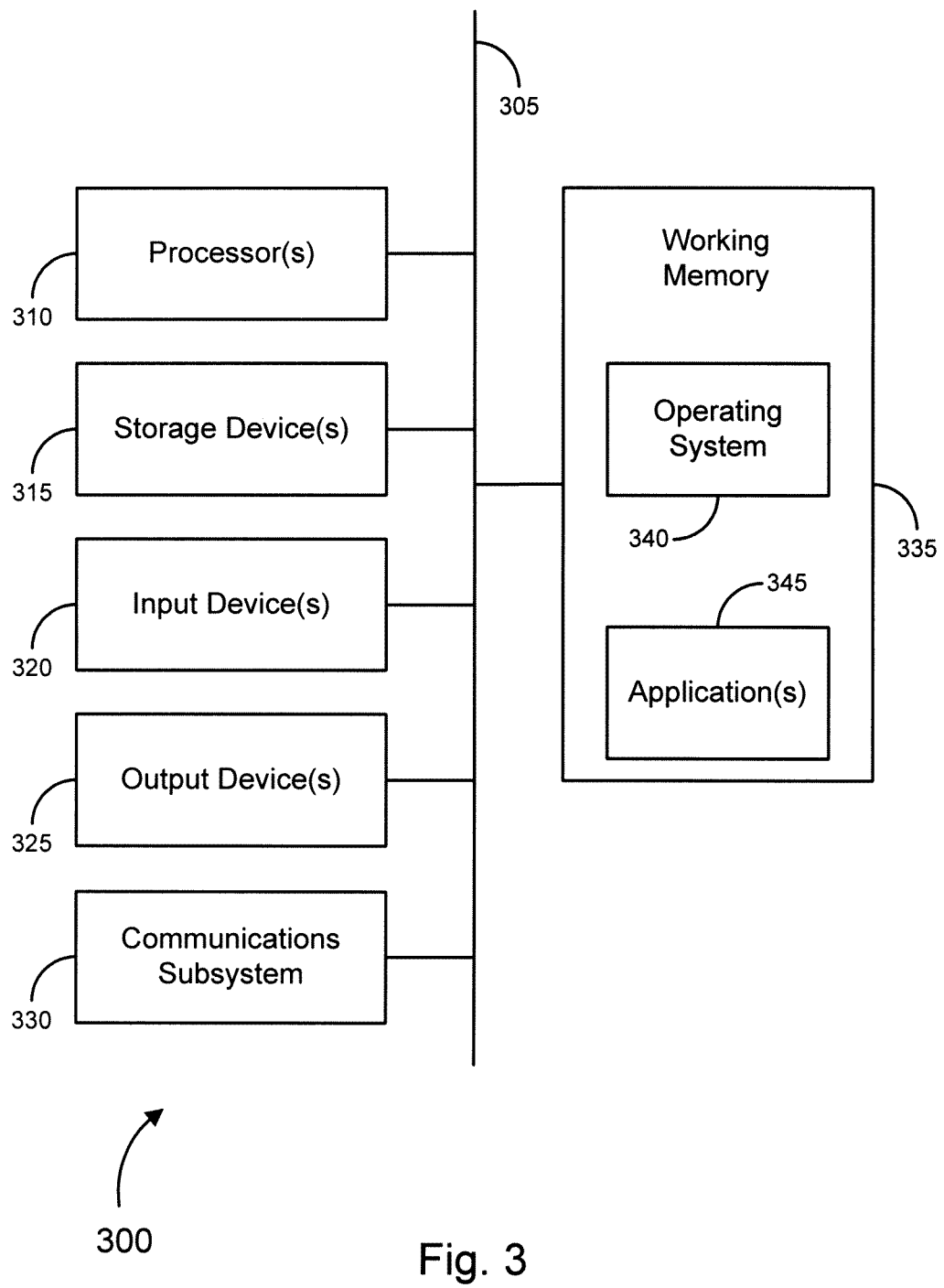
FIG. 3 is a generalized schematic diagram of a computer that may be implemented in a system for combating online fraud, in accordance with various embodiments of the invention.

FIG. 3 provides a generalized schematic illustration of one embodiment of a computer system 300 that can perform the methods of the invention and/or the functions of a master computer, monitoring computer and/or response computer, as described herein. FIG. 3 is meant only to provide a generalized illustration of various components, any of which may be utilized as appropriate. The computer system 300 can include hardware components that can be coupled electrically via a bus 305, including one or more processors 310; one or more storage devices 315, which can include without limitation a disk drive, an optical storage device, solid-state storage device such as a random access memory ("RAM") and/or a read-only memory ("ROM"), which can be programmable, flash-up-dateable and/or the like (and which can function as a data store, as described above). Also in communication with the bus 305 can be one or more input devices 320, which can include without limitation a mouse, a keyboard and/or the like; one or more output devices 325, which can include without limitation a display device, a printer and/or the like; and a communications subsystem 330; which can include without limitation a modem, a network card (wireless or wired), an infra-red communication device, and/or the like).

The computer system 300 also can comprise software elements, shown as being currently located within a working memory 335, including an operating system 340 and/or other code 345, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 4:
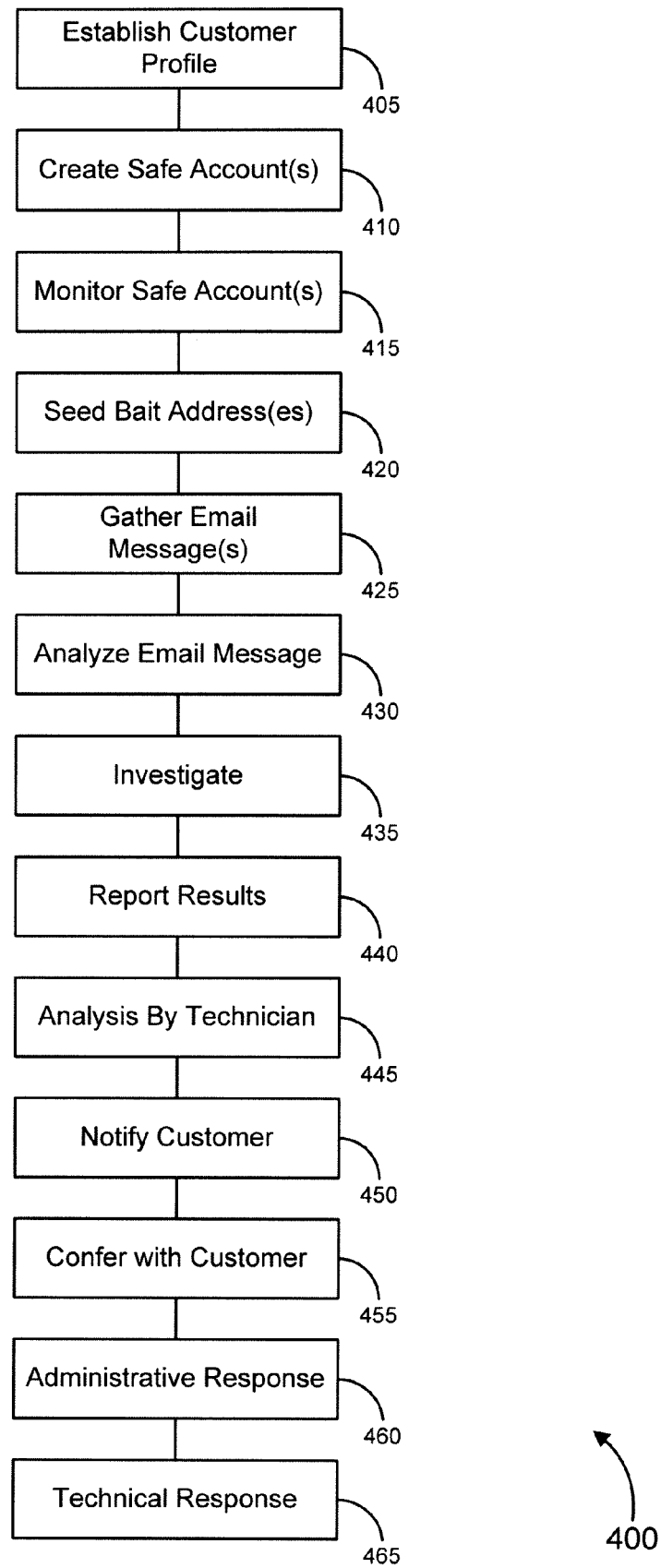
FIG. 4 is a process flow diagram illustrating a method of combating online fraud, in accordance with various embodiments of the invention.

Another set of embodiments provides methods of combating online fraud which can be, in some cases, implemented by a computer or embodied in a computer software program. These methods may be, but need not be, implemented as a computer software application and/or with a computer system, including the systems described above. FIG. 4 illustrates a method 400 that is exemplary of one set of embodiments. The exemplary method 400 can include establishing a customer profile (block 405) for one or more customers. The customer profile can identify a blacklist of particular keywords that may indicate an incoming email message is attempting to spoof the customer. For instance, for a customer in the financial services industry, key words could be "loan," "account," "credit card," and/or the like. The customer profile can also identify servers, URLs, domains and/or IP addresses known to be involved with phishing activities involving that customer, as well as default configuration information, such as the customer's threshold for considering an email message as a phish (e.g., relatively lenient or relatively strict), and/or the customer's preferences for responding to fraudulent activity (e.g., a preference for administrative response, a preferred level of technical response, etc.).

At block 410, one or more "safe accounts" may be created, e.g., in the customer's system. These safe accounts can be valid accounts (e.g., active credit card accounts) that do not correspond to any real account holder, and the safe accounts may be associated with fictitious personal information, including a valid (or apparently valid) identifier, such as an account number, social security number, credit card number, etc., that does not correspond to any real account holder but may be accepted as valid by the customer's system. The safe accounts thereafter can be monitored (block 415) for any transactions or access attempts. Because the safe accounts do not correspond to a real account holder, any transactions, access attempt, etc. ("account activity") represent an illegitimate use. In addition, the safe account can be used to trace the use of the identifier, as described in more detail below, and/or to compile an evidentiary record of fraudulent activity.

At block 420, bait email addresses can be seeded to appropriate locations, as described above. The task of seeding the bait addresses can be automated (e.g. performed by a computer system such as a honey pot, etc.) and/or performed manually. For instance, an automated process could post newsgroup items that include bait email addresses, create a domain registration with a bait email address as the administrative contact, compile and/or distribute lists of bait addresses formatted to appear as a list of harvested addresses, etc. In some cases, the bait addresses may be selected to be attractive to phishers (e.g., from attractive domains and/or using English proper names as the userids) and/or to be prioritized on harvested lists (e.g., having userids that begin with numbers, the letter a, or non-alphabetic characters, etc.). In this way, if a phisher sends a phish message to each of the addresses on a harvested list, there may be a higher probability that the bait addresses will receive the phish message relatively early in the mailing process, allowing the system to take responsive action before many actual recipients have had a chance to provide personal information in response to the phish.

After the bait email addresses have been seeded, any incoming email messages to the bait addresses can be gathered (block 425), using any acceptable procedure, including the procedures discussed above. In accordance with some embodiments, for example, gathering an incoming email message can comprise downloading the incoming email message from a honey pot/mail server and/or converting the email message into a data file, which can have separate portions and/or fields corresponding to the header information of the email message, the body portion of the email message, any URLs included in the email message, and/or any attachments to the email message. Gathering the email message can further comprise transmitting the email message to a correlation engine for analysis, and/or the correlation downloading the email message.

Figure 5:
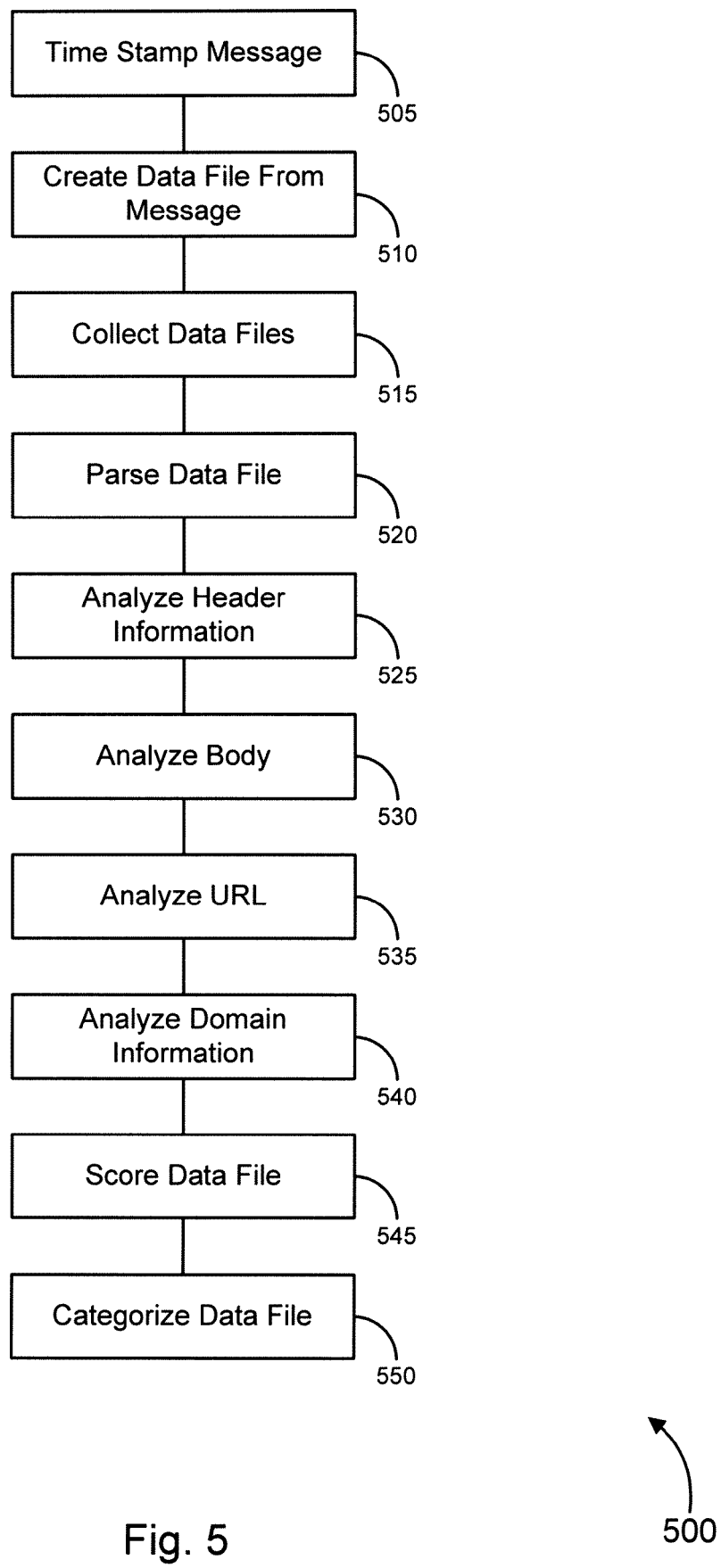
FIG. 5 is a process flow diagram illustrating a method of collecting and analyzing suspicious email messages, in accordance with various embodiments of the invention.

Any gathered incoming email messages (and/or corresponding data files) can be analyzed to determine whether the message should be categorized as a likely phish (i.e., a fraudulent email message) (block 430). FIG. 5 illustrates in detail a method 500 of analyzing an incoming email message (or data file) in accordance with certain embodiments of the invention. (In the discussion of FIG. 5, the terms data file and message are used interchangeably, since the methods of analysis can apply equally to a message and a data file, which may, as discussed above, correspond to a received email message but which also may correspond to a different source, such as a news group posting, web page, and/or the like. Similarly, the other methods discussed herein may be applied to data files corresponding to such sources.) It should be noted that some of the procedures illustrated on FIG. 5 may, in particular embodiments, take place at other points in the method 400 illustrated by FIG. 4 (including, for example, gathering incoming email messages (block 400)), and that the organization of the procedures in these methods (and indeed, all of the methods described herein) is merely for ease of description: Certain procedures may occur in an order different than that described herein; indeed, some procedures may be omitted in accordance with various embodiments of the invention.

The method 500 illustrated on FIG. 5 can include time stamping the message (block 505), which can provide a permanent indication of when the message was received and/or facilitate the comparison of different messages, as well as creating a data file from the message (block 510), perhaps in the manner described above. The data files may then be collected (block 515), for instance, by transmitting the data files to a correlation engine and/or by the correlation engine downloading the data files from the computer (e.g. honey pot) that gathered the data files. (In some cases, it may not be necessary to collect the data files; for instance, the correlation engine and the honey pot may be incorporated within a single software program or program module and/or be running on the same computer.)

A data file may then be parsed or read by the correlation engine (block 520) to allow the fields or sections of the data file to be analyzed by the correlation engine. For example, the header information can be analyzed (block 525) to determine, for instance, whether the source and/or destination information in the header has been forged. If so, it is relatively more likely that the email is a phish. As another example, the routing information in the message header may be analyzed to determine whether the message originated from and/or was routed through a suspect domain, again enhancing the likelihood that the message is a phish.

The body of the message (i.e., the body field of a data file) can then be analyzed (block 530). The analysis of the body can include searching the body for blacklisted and/or whitelisted terms; merely by way of example, a blacklisted term might include terms commonly found in phish messages, such as "free trip" terms indicating that the message refers to personal information, such as "credit card," "approval," "confirm," etc.; and/or brand names, the name of a customer, etc. Conversely, whitelisted terms are those that commonly indicate that the message is not a phish. It should be noted at this point that the system can be configured to provide a feedback loop, such that if a message is determined eventually to be a phish, the list of blacklisted terms can be automatically updated to include the text of that message (or portions of that text). Further, the correlation engine can include heuristic algorithms designed to defeat common phish tactics, such as obvious misspellings, garbage text, and the like.

Analyzing the body of the message can include other forms of analysis as well. Merely by way of example, if the body includes a URL or other form of redirection, the presence of those devices can also indicate a higher likelihood that the message is a phish. (In addition, the URLs and other redirection devices can be analyzed separately, as discussed below). Moreover, other factors, such as the length of the body of the email message, whether the body includes graphics, etc., can be considered in the analysis of body of the email message.

In addition, if the message does include a URL (or any other form of redirection), the URL can be analyzed. For example, DNS and/or WHOIS data for the domain associated with the URL can be accessed. If this data indicates that the URL does not resolve to a domain (e.g., the URL resolves only to an IP address), the URL may be part of a phishing scam. Similarly, those skilled in the art can appreciate that phishing scams often are based from servers/domains outside the United States; as well, a particular domain may be known to be likely to host phishing scams. Hence, if the URL resolves to a suspicious domain or global top-level domain ("gTLD"), the URL may be part of a phishing scam. Thus, information about the domain to which the URL resolves may be analyzed (block 540), either as a separate step or as a part of the URL analysis. Further, in determining whether a domain is suspicious, the domain may be compared to any brand information contained in the body of the message. For example, if the body of the message includes the brand name of a customer, and the URL resolves to a domain different than a domain owned by and/or associated with that customer, the URL can be considered suspicious.

Upon the completion of the analysis (of any portion of a message, as discussed above, and/or of the message as a whole), the data file/message may, in some embodiments be assigned a score (block 545). Assigning a score to the data file/message can provide a quantitative measurement of the likelihood that the message is a phish, and in such embodiments, a score can be compared to a threshold score, such that a score meeting a particular threshold can result in further analysis and/or investigation, while a score not meeting that threshold can indicate a judgment that the email is not a probable phish. In some embodiments, the overall analysis of the message can result in the assignment of a single score. In other embodiments, each level of analysis (e.g., the analysis of the header, of the body, of the URL and/or of the associated domain) can result in the assignment of a separate score, and/or these separate scores can be consolidated to form a composite score that can be assigned to the message. In other embodiments, the analysis of each data file or email message can be performed in hierarchical fashion: the header information may be analyzed and scored, and only if that score meets a certain threshold will the correlation engine proceed to analyze the body. If not, the message is considered not to be a phish and the analysis ends. Likewise, only of the score resulting from the body analysis reaches a certain threshold will the URL be analyzed, etc.

The score values for various findings can be arbitrary, and they can reflect a judgment of the relative importance of various factors in the analysis. Further, based on the disclosure herein, one skilled in the art can appreciate that the scaling of the scores for various portions of the message (and/or the threshold scores for proceeding to the next stage of analysis) can be adjusted depending on the relative reliability of the analysis of each portion in determining whether the message actually is a phish, as well as the desired degree of precision in identifying possible phish messages. Moreover, the correlation engine can employ an automatic feedback loop, as described above, allowing the correlation engine to be self-tuning if desired for instance, if a particular factor proves to be a reliable indicator in categorizing a message, the correlation engine can automatically begin to give that factor more weight.

To understand how a hierarchical scoring system may be implemented in accordance with some embodiments, consider the following example. An email message with a forged header may be accorded a score of 150, and if a score over 100 is required to proceed to the analysis of the body, that analysis will be performed. The presence of a customer's name in the body may be worth a score of 1000, and the presence of the term "confirm your credit card" may be worth a score of 2000. A score over 2500 may be required to proceed to URL analysis, so if the message includes both terms, it will have a score of 3150 and will proceed to URL analysis. Finally, if the URL resolves to an IP address, that may be worth a score of 10000. If the threshold composite score for considering a message to be a likely phish is 12000, the composite score of the message (13150) would indicate that the email likely is a phish. (It should be noted that, while, for purposes of illustration, this example requires the assigned score to exceed the threshold score, in other embodiments, a score might have to be lower than the threshold score to meet the threshold. That is, the required relationship between the assigned score and the threshold score is discretionary. It should also be noted that certain factors, such as the presence of a white listed term, can detract from a score.)

After the analysis of the message/data file is complete, the message may be categorized as a phish (block 550). In some embodiments, a scoring algorithm similar to those discussed above may be used to categorize the message. In some cases, the categorization can depend on an overall and/or composite score for the message, while in other cases, the categorization might depend only on a score for a particular section (e.g., the body portion, the URL, etc.). Other methods of categorization may be used as well. For example, the mere presence of any particular blacklisted term, a URL resolving to a suspicious domain, etc. may cause the message to be categorized as a phish. The choice of criteria for categorization is discretionary.

Figure 6:
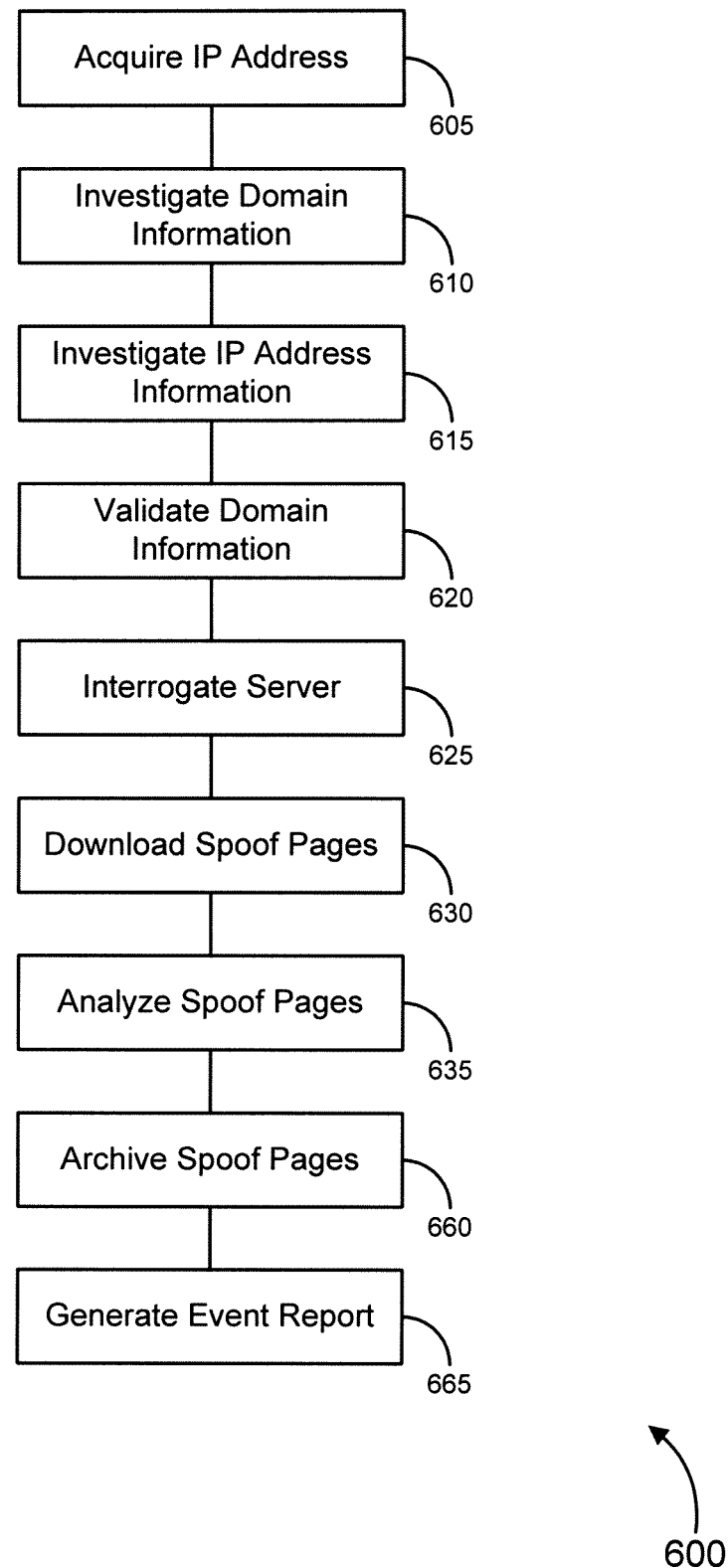
FIG. 6 is a process flow diagram illustrating a method of investigating a suspicious uniform resource locator, in accordance with various embodiments of the invention.

Returning now to FIG. 4, once an email message and/or data file has been categorized as a phish, an event may be created in an event manager and/or a more rigorous investigation may be performed (block 435), for instance by an event manager. FIG. 6 illustrates an exemplary method 600 detailing various procedures that may be undertaken as part of the investigation. At block 605, the IP address of the server referenced by a URL included in the message may be acquired via any of several well-known methods, such as a DNS query (or, if the URL refers to an IP address instead of a hostname, the URL itself).

In addition, an apparent address for the server referenced by the URL may be identified. Those skilled in the art can appreciate that a URL may be associated with an "anchor," which can be text, an image, etc., such that the anchor appears to be the address for the server referenced by the URL, while the actual URL remains hidden to a casual observer. (In other words, the user may select the anchor in a web browser, email client, etc. to be redirected to the server referenced by the URL). In this way, the anchor may comprise an "apparent address" that actually is different than the address referenced by the URL. Both the apparent address (e.g., the address in the anchor) and the address of the server referenced in the URL (i.e., the actual address in the URL) may comprise a hostname (usually including a domain) and/or an IP address. In addition, the anchor may comprise an identifier for a trusted entity (a business name, etc.) If the apparent address is different than the address actually referenced by the URL (and/or the apparent address comprises an identifier for a trusted entity while the address actually referenced by the URL is not associated with that trusted entity), it may be more likely that the URL is fraudulent and/or that the server reference by the URL is engaged in fraudulent activity.

The method 600 may also comprise investigating information about the domain to which the URL resolves may be investigated (block 610), for instance through a domain WHOIS query. This information can show the owner of the domain, the assigned name server for the domain, the geographic location of the domain and administrative contact information for the domain. In addition, information about the IP block to which that domain should be assigned can be investigated (block 615), which can elicit similar information to the domain WHOIS query, as well as an indication of which IP block the domain should relate to. Further, the domain information referenced by the URL can be verified (block 620), for instance by comparing the IP address obtained through the DNS query (or via the URL, if the URL contains an IP address instead of a hostname) with the IP block to which the domain should belong. Any discrepancy in the domain information can indicate that the domain has been spoofed in the message, providing further evidence that the message is likely a phishing attempt.

At block 625, the server to which the URL refers can be interrogated, using a variety of commercially-available tools, such as port scanners, etc. In some embodiments, the NMAP application and/or the Nessus application may be used to interrogate the server. In a particular set of embodiments, these tools may be incorporated into a proprietary application (which may also perform other investigation, as discussed above) to provide more robust interrogation of the server. The interrogation of the server can indicate what services the server is running (which can provide some indication of whether the server is engaged in fraudulent activity). For instance, if the server is accepting HTTP requests on an unusual port, that service may (or may not) indicate that the server is engaged in fraudulent activity. The interrogation of the server may also show security vulnerabilities, which can indicate that the server may be compromised and therefore may be engaged in fraudulent activity without the knowledge of the server operator. In addition, the route to the server may be traced in a well-known manner, providing more information about the server, its location, and the domain/IP block in which it resides.

Interrogating the server can include downloading some or all of the web pages served by that server (using, for example, the WGET command) (block 630), especially any pages that appear to masquerade as pages on other servers (spoof pages). The downloaded pages may be analyzed to determine whether the pages request any personal information and/or provide fields for a user to provide personal information (block 635). Further, downloaded pages may be archived (block 660), which can allow a technician and/or the customer to view the pages to assist in any necessary human evaluation of whether the pages actually are fraudulently requesting personal information.

Finally, an event report may be generated (block 665). The event report may include any or all of the information obtained through the investigation, including any archived pages. The event report may be consulted by a technician and/or provided to a customer to assist in formulating a response strategy. In some cases, a redacted version of the event report may be provided to the customer.

Returning once again to FIG. 4, the results of the investigation may be reported (block 440), for instance by displaying a copy of the event report to a technician at a monitoring center (or any other location). Optionally, the technician may analyze the report (block 445) to provide a reality check on the information obtained in the investigation and/or to formulate a response strategy. The customer may be notified of the event and/or of the investigation results (block 450), by an automated email message, phone call from a technician, etc. The technician may also confer with the customer (block 455) to allow the customer to make a decision with respect to how to respond to the attempted fraud. Alternatively, a customer profile may indicate that a specific response strategy should be pursued, such that the customer need not be consulted before formulating a response strategy.

If the investigation and/or event report indicates that the server is engaging in fraudulent activity, the method 400 can include responding to the fraudulent activity. Any such response may be initiated and/or pursued automatically and/or manually (i.e., at the direction of a technician). Responses can take a variety of forms. Merely by way of example, the customer, customer policy and/or technician may determine that an administrative response (block 460) is appropriate. An administrative response can include any response that does not involve a direct response against the server. For example, one possible administrative response is notifying the ISP hosting the server and/or the registrar for the server's domain that the server is engaged in fraudulent activity. Another administrative response could be notifying legal authorities about the fraudulent activity and/or preparing evidence for a case under the Uniform Domain-Name-Dispute Resolution Policy ("UDRP"). If the investigation reveals that the server may have been compromised, an administrative response can include notifying the server operator (perhaps via contact information obtained during the investigation of the event) that the server has been compromised and/or providing advice on how to secure the server to avoid future compromises.

Figure 7:
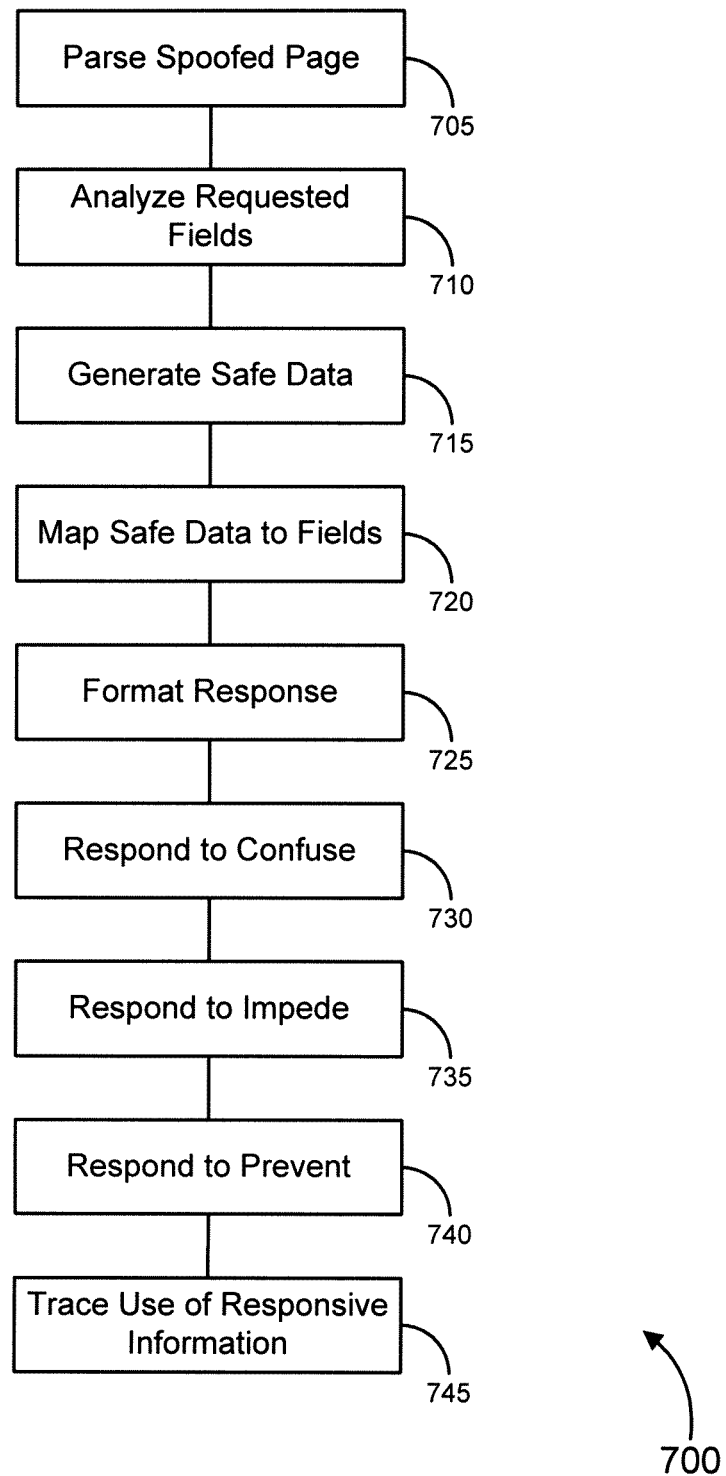
FIG. 7 is a process flow diagram illustrating a method of responding to an attempted online fraud, in accordance with various embodiments of the invention.

In addition (or as an alternative) to administrative responses, it may be desirable to pursue a direct technical response against the server (block 465). FIG. 7 illustrates an exemplary method 700 for pursuing a technical response against a server. The method 700 can include parsing a spoofed web page to identify fields in which a user may provide personal information (block 705). Those skilled in the art will recognize that a web form comprises one or more fields, and that those fields generally include a label indicating the information that should be entered. In accordance with some embodiments, therefore, a set of requested fields from the web page may be analyzed (block 710); for instance the label accompanying each field can be analyzed to determine whether the field requests personal information, and in what format the information should be submitted. This analysis can include a search for common words, such as "first name," "credit card," "expiration," etc., as well as an analysis of any restrictions imposed by the field (e.g., data type, length, etc.) A set of "safe" data may be generated to populate the fields requesting personal information (and/or any other necessary fields) (block 715). In some cases, the safe data can correspond to a safe account, as discussed above. In any event, the safe data can comprise data that appears to be valid (and in fact may be valid, in that it corresponds to a valid account) but that does not pertain to any real account holder or other person. The safe data can be drawn from a database and/or dictionary of safe data (e.g., fictitious first and last names, addresses, etc.) and/or generated algorithmically (e.g., account numbers, credit card numbers, expiration dates, etc.) and/or some combination of the two.

Based on the analysis of the requested fields, the safe data can be mapped to the requested fields (block 720), such that the data is formatted to appear to be actual personal information for a user. Merely by way of example, if a field requests a credit card number, safe data representing an apparently valid credit card number (e.g. a sixteen digit number starting with a "4," which would appear to be a valid Visa™ credit card number) can be mapped to that field. A responsive message may be generated and/or formatted to look like a filled-out form from the spoofed web page (block 725) and then may be submitted to the server. This process can be repeated as necessary, creating a plurality of "safe" responses.

Safe responses may be submitted to the server in a number and frequency determined by a response strategy. For instance, a "respond to confuse" strategy may be employed, whereby relatively few safe responses are submitted to the server (block 730). This strategy can have the effect of introducing invalid data into the server's database, thereby causing uncertainty for the phisher about which of the data collected actually represents valid personal information that can be exploited and which of the data collected is mere garbage. This alone can significantly affect the profitability of a phishing scam and may be sufficient to prevent the phisher from exploiting significant amounts of valid personal information received from actual consumers. In addition, if the safe data is associated with a safe account, and the phisher attempts to exploit the safe data, the phisher's use of that data can be traced, and an evidentiary trail of the phisher's activities can be compiled, aiding the identification of the phisher and possibly providing evidence for a civil litigation or criminal prosecution.

If desired, a "respond to impede" strategy can be pursued (block 740). In this strategy, safe responses can be transmitted in greater numbers and/or at a greater rate. Safe responses can also be sent from a plurality of response computers, which can reside in different domains and/or IP blocks, preventing easy detection by the phisher of which responses comprise safe information (and are therefore useless to the phisher). In addition to the benefits of the "respond to confuse" strategy (which are in fact magnified under this strategy), the "respond to impede" strategy may signal to the phisher that his scam has been discovered, possibly providing a deterrent against continuing with the scam.

Finally, a "respond to prevent" strategy may be undertaken (block 745). The respond to prevent strategy can involve transmitting large numbers of safe responses at a high rate from numerous, possibly widely-distributed, response computers. In fact, response rates can be sufficiently high to effectively prevent the server from being able to accept any substantial quantity of real responses from actual consumers or others, effectively terminating the scam. This strategy can be pursued until the server stops accepting responses, and may in fact be continued in case the server once again begins accepting responses.

In conclusion, the present invention provides novel solutions for dealing with online fraud. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

The invention claimed is:

1. A computer system for responding to a fraudulent attempt to collect personal information, the computer system comprising:
   a processor; and
   a memory communicatively coupled with the processor, the memory having stored therein instructions which, when executed by the processor, cause the processor to:
   download a web page from a suspicious server;
   parse the web page to identify a form within the web page, the form comprising at least one field into which a user may enter personal information and a label associated with each field, the label indicating the personal information requested;
   analyze the at least one field and associated label to identify a type of information requested by the at least one field;
   determine, based at least in part on analysis of the at least one field and associated label, that the suspicious service is engaged in a fraudulent attempt to collect confidential personal information;
   generate a set of safe data comprising personal information associated with a fictitious entity;
   based on analysis of the at least one field and associated label, select at least a portion of the set of safe data comprising the type of information requested by the at least one field and indicated by the associated label;
   format a response to the web page, the response including the portion of the safe data comprising the type of information requested by the at least one field and indicated by the associated label; and
   transmit the response to the web page for reception by the suspicious server.

2. A computer system for responding to a fraudulent attempt to collect personal information as recited in claim 1, wherein analyzing the at least one field to identify a type of information requested by the field comprises interpreting the label associated with the at least one field.

3. A computer system for responding to a fraudulent attempt to collect personal information as recited in claim 1, wherein the set of safe data is associated with a financial account, and wherein the instructions further cause the processor to:
   monitor the financial account for an account activity evidencing a use of information obtained from the set of safe data; and
   trace the account activity to identify an entity using the information obtained from the set of safe data.

4. A computer system for responding to a fraudulent attempt to collect personal information as recited in claim 1, wherein the instructions further cause the processor to:
   generate a plurality of sets of safe data, each of the sets of safe data comprising personal information associated with a fictitious entity;
   based on an analysis of the at least one field, select at least a portion of each of the sets of safe data responsive to the at least one field;
   format a plurality of responses to the web page, each of the plurality of response including the portion of one of the sets of safe data, each of the portions of one of the sets of safe data being responsive to the at least one field; and
   transmit the plurality of responses to the web page for reception by the suspicious server.

5. A computer system for responding to a fraudulent attempt to collect personal information as recited in claim 4, wherein the instructions further cause the processor to:
   transmit for reception by the suspicious server a number of responses to the web page sufficient to cause a recipient of the responses to be uncertain which of a plurality of responses include valid personal information.

6. A computer system for responding to a fraudulent attempt to collect personal information as recited in claim 4, wherein the instructions further cause the processor to:
   transmit for reception by the suspicious server a number of responses to the web page sufficient to indicate that the fraudulent attempt to collect personal information has been discovered.

7. A computer system for responding to a fraudulent attempt to collect personal information as recited in claim 4, wherein the instructions further cause the processor to:
   transmit for reception by the suspicious server a number of responses to the web page sufficient to prevent the suspicious server from receiving any responses comprising valid personal information.

8. A method for responding to a fraudulent attempt to collect personal information, the method comprising:
   downloading, by a computer system, a web page from a suspicious server;
   parsing, by the computer system, the web page to identify a form within the web page, the form comprising at least one field into which a user may enter personal information and a label associated with each field, the label indicating the personal information requested;

analyzing, by the computer system, the at least one field and associated label to identify a type of information requested by the at least one field;

determining, by the computer system based at least in part on analysis of the at least one field and associated label, that the suspicious service is engaged in a fraudulent attempt to collect confidential personal information;

generating, by the computer system, a set of safe data comprising personal information associated with a fictitious entity;

based on analysis of the at least one field and associated label, selecting, by the computer system, at least a portion of the set of safe data comprising the type of information requested by the at least one field and indicated by the associated label;

formatting, by the computer system, a response to the web page, the response including the portion of the safe data comprising the type of information requested by the at least one field and indicated by the associated label; and transmitting, by the computer system, the response to the web page for reception by the suspicious server.

9. The method of claim 8, wherein analyzing the at least one field to identify a type of information requested by the field comprises interpreting the label associated with the at least one field.

10. The method of claim 8, wherein the set of safe data is associated with a financial account, the method further comprising:

monitoring, by the computer system, the financial account for an account activity evidencing a use of information obtained from the set of safe data; and tracing, by the computer system, the account activity to identify an entity using the information obtained from the set of safe data.

11. The method of claim 8, further comprising:

generating, by the computer system, a plurality of sets of safe data, each of the sets of safe data comprising personal information associated with a fictitious entity;

based on an analysis of the at least one field, selecting, by the computer system, at least a portion of each of the sets of safe data responsive to the at least one field;

formatting, by the computer system, a plurality of responses to the web page, each of the plurality of response including the portion of one of the sets of safe data, each of the portions of one of the sets of safe data being responsive to the at least one field; and transmitting, by the computer system, the plurality of responses to the web page for reception by the suspicious server.

12. The method of claim 11, further comprising:

transmitting, by the computer system for reception by the suspicious server, a number of responses to the web page sufficient to cause a recipient of the responses to be uncertain which of a plurality of responses include valid personal information.

13. The method of claim 11, further comprising:

transmitting, by the computer system for reception by the suspicious server, a number of responses to the web page sufficient to indicate that the fraudulent attempt to collect personal information has been discovered.

14. The method of claim 11, further comprising:

transmitting, by the computer system for reception by the suspicious server, a number of responses to the web page sufficient to prevent the suspicious server from receiving any responses comprising valid personal information.

15. A computer-readable memory having stored thereon a sequence of instructions which, when executed by a processor, cause the processor to respond to a fraudulent attempt to collect personal information by:

downloading a web page from a suspicious server;

parsing the web page to identify a form within the web page, the form comprising at least one field into which a user may enter personal information and a label associated with each field, the label indicating the personal information requested;

analyzing the at least one field and associated label to identify a type of information requested by the at least one field;

determining, based at least in part on analysis of the at least one field and associated label, that the suspicious service is engaged in a fraudulent attempt to collect confidential personal information;

generating a set of safe data comprising personal information associated with a fictitious entity;

based on analysis of the at least one field and associated label, selecting at least a portion of the set of safe data comprising the type of information requested by the at least one field and indicated by the associated label;

formatting a response to the web page, the response including the portion of the safe data comprising the type of information requested by the at least one field and indicated by the associated label; and transmitting the response to the web page for reception by the suspicious server.

16. The computer-readable memory of claim 15, wherein analyzing the at least one field to identify a type of information requested by the field comprises interpreting the label associated with the at least one field.

17. The computer-readable memory of claim 15, wherein the set of safe data is associated with a financial account, the method further comprising:

monitor the financial account for an account activity evidencing a use of information obtained from the set of safe data; and trace the account activity to identify an entity using the information obtained from the set of safe data.

18. The computer-readable memory of claim 15, further comprising:

generating a plurality of sets of safe data, each of the sets of safe data comprising personal information associated with a fictitious entity;

based on an analysis of the at least one field, selecting at least a portion of each of the sets of safe data responsive to the at least one field;

formatting a plurality of responses to the web page, each of the plurality of response including the portion of one of the sets of safe data, each of the portions of one of the sets of safe data being responsive to the at least one field; and transmitting the plurality of responses to the web page for reception by the suspicious server.

19. The computer-readable memory of claim 18, further comprising:

transmitting for reception by the suspicious server a number of responses to the web page sufficient to cause a recipient of the responses to be uncertain which of a plurality of responses include valid personal information.

20. The computer-readable memory of claim 18, further comprising:

transmitting for reception by the suspicious server a number of responses to the web page sufficient to indicate that the fraudulent attempt to collect personal information has been discovered.

21. The computer-readable memory of claim 18, further comprising:
transmitting for reception by the suspicious server a number of responses to the web page sufficient to prevent the suspicious server from receiving any responses comprising valid personal information.

* * * * *